(12) United States Patent
Bogoslofski et al.

(10) Patent No.: US 8,534,522 B2
(45) Date of Patent: Sep. 17, 2013

(54) ANTI-SWAY ARRANGEMENT FOR CARGO ON A LOAD CARRIER

(75) Inventors: Kevin Bogoslofski, Southington, CT (US); Vincent A. Bove, Bethlehem, CT (US); John R. Laverack, Southbury, CT (US); John J. Pelosi, Torrington, CT (US)

(73) Assignee: Thule Sweden AB, Hillerstorp (SE)

( * ) Notice: Subject to any disclaimer, the term of this patent is extended or adjusted under 35 U.S.C. 154(b) by 14 days.

(21) Appl. No.: 12/838,346

(22) Filed: Jul. 16, 2010

(65) Prior Publication Data
US 2011/0042433 A1 Feb. 24, 2011

Related U.S. Application Data

(63) Continuation of application No. 11/163,841, filed on Nov. 1, 2005, now Pat. No. 7,757,917.

(60) Provisional application No. 60/522,730, filed on Nov. 1, 2004.

(51) Int. Cl.
*B60R 11/00* (2006.01)

(52) U.S. Cl.
USPC ........... 224/537; 224/533; 224/536; 224/924; 224/570; 224/571

(58) Field of Classification Search
USPC .......... 224/533, 924, 519, 537, 324, 522, 224/536, 545, 567, 935, 532, 555, 553, 314, 224/488, 570, 571, 414, 419, 420, 429, 430, 224/431; 248/229.13, 230.4, 316.5, 316.6, 248/316.1; 403/361; 24/16 PB
See application file for complete search history.

(56) References Cited

U.S. PATENT DOCUMENTS

| | | | | | |
|---|---|---|---|---|---|
| 3,913,187 | A | * | 10/1975 | Okuda | 24/484 |
| 4,817,901 | A | * | 4/1989 | Kuo | 248/230.8 |
| 5,259,542 | A | * | 11/1993 | Newbold et al. | 224/324 |
| 5,305,978 | A | * | 4/1994 | Current | 248/230.4 |
| 5,593,125 | A | * | 1/1997 | Storz et al. | 248/316.5 |
| 6,315,256 | B1 | * | 11/2001 | Tolar | 248/230.4 |
| 6,321,962 | B1 | * | 11/2001 | Morris et al. | 224/505 |
| 6,467,664 | B2 | * | 10/2002 | Robins et al. | 224/537 |
| 6,494,351 | B1 | * | 12/2002 | Dean | 224/324 |
| 6,516,986 | B1 | * | 2/2003 | Lassanske et al. | 224/533 |
| 6,616,023 | B1 | * | 9/2003 | Dahl et al. | 224/537 |
| 6,988,645 | B1 | * | 1/2006 | Nusbaum et al. | 224/519 |
| 7,213,731 | B1 | * | 5/2007 | Kolda | 224/537 |

* cited by examiner

*Primary Examiner* — Adam Waggenspack
(74) *Attorney, Agent, or Firm* — Novak Druce Connolly Bove + Quigg LLP

(57) ABSTRACT

Method and apparatus for providing and anti-sway arrangement for stabilizing a bicycle supported upon a cradle borne upon an elongate arm of a vehicular mountable load carrier. The arrangement includes a cradle borne upon an elongate arm of a vehicular mountable load carrier. The elongate arm is insert-received in a through-hole located in the cradle and the cradle is configured to abuttingly receive a portion of a bicycle frame thereupon. An anti-sway device is included that has a substantially Y-shape with two upper arms straddling the cradle, and the two upper arms are joined together at a lower common leg thereof. Each of the two upper arms have an arm engaging portion having a releasable clasp that is operator transitionable between a clasping configuration in which the anti-sway device is secured to the elongate arm and an open configuration in which the device is installable upon and removable away from the arm in a direction transverse to a longitudinal axis of the elongate arm and whereby the anti-sway device accommodates installation onto, and removal off of, the elongate arm of the load carrier without disengagement of the cradle from the elongate arm.

22 Claims, 29 Drawing Sheets

ANTI-SWAY ARRANGEMENT FOR CARGO ON A LOAD CARRIER

CROSS-REFERENCE TO RELATED APPLICATIONS

The present application is a continuation of U.S. application Ser. No. 11/163,841, filed 1 Nov. 2005 now U.S. Pat. No. 7,757,917, which claims the benefit of U.S. provisional application No. 60/522,730, filed 1 Nov. 2004. U.S. application Ser. No. 11/163,841 and U.S. provisional application are expressly incorporated herein by reference in their entireties.

FIELD OF THE INVENTION

The present invention relates generally to carriers mountable to vehicles for transporting sports equipment. More particularly, it relates to stabilization or anti-sway devices utilized in conjunction with arm-born cradles on such carriers that prevent undesired movement of the cargo during transport.

BACKGROUND OF THE INVENTION

Many types of sports equipment are useable only under certain conditions and/or in specific locales. Examples of such sports equipment include surfboards that are ridden at beaches and snow skis that are normally used at ski resorts. The beach and ski areas are often remotely located from the homes of those who use them, Therefore, the need for transporting sports equipment upon vehicles to these locations has long been recognized.

In the instance of bicycling, a rider will often desire to ride his or her bicycle in different areas without having to ride the bicycle to those areas. To facilitate the transportation of one or more bicycles, bicycle carriers mountable to passenger vehicles have been developed. A popular category of carriers are those that are mountable to the rear end of a vehicle, however, it should be appreciated that most basic carrier designs can be adapted to be mounted at other locations upon a vehicle as long as the location is convenient for loading the bicycles onto the carriers and neither the bicycles nor the carrier inconveniences the driver or obstructs visibility.

A sports equipment carrier may not always be utilized on the same carrying vehicle or for carrying the same pieces of sports equipment such as bicycles. In fact, body configurations vary widely among different passenger vehicles, as do bicycle size and configuration. If the configuration of the carrier were fixed, the utilization of such a carrier would be significantly restricted.

Another aspect of such load carriers often suffering from deficient design is the cradle upon which the bicycles rest, and by which the bicycles are secured to the carrier. Typically, these cradles provide an important buffer between the carrier and the bicycle, as well as a means for securement. Different configurations for such cradles often include a securing band or strap that wraps around the supported bicycle frame member.

In a load carrier arrangement typified by that illustrated in FIG. 1, there are load bearing cradles positioned on the arms utilizing a through-hole provided therein; such cradles normally being more or less constructed out of at least semi-hard plastic or resin. At the time of manufacture of such cradles, the through-hole is provided with an interior diameter that is less than the expected exterior diameter of the carrying arm. Therefore, a tight fit will be established between the combination of the two pieces (cradle and arm), and in this way the cradle is located at an effectively fixed position on the arm during both periods of use and nonuse. Still further, the fit is sufficiently tight so that when a bicycle is placed on the cradle, the combined assemblage (bicycle on the cradle) is prevented from moving with respect to the arm during normal operating maneuvers of the carrying vehicle.

In contrast, an operator typically also wants to be able to move the cradle on the arm so that it can be variably positioned thereupon. This gives rise to two competing goals; one which desires to fix the cradle on the arm and another to enable user induced, relative movement of the cradle for permitting the establishment of different carrying positions of the cradle on the arm.

Because of the cradle's typical construction from predominantly hard plastic, a problem arises and is rooted in the well appreciated (by those persons skilled in the technicalities of material science) phenomenon of cold-flow "creep" or "compressive set". The practical effect resulting from cold-flow creep in the present instance is that the "stretched" configuration of the cradle is eventually assumed by the base causing there to no longer be a tight fit between the cradle and arm. The detriment to the user is that the cradle now has either little or no resistance to movement on the arm, which translates into an inability to hold-fast an article positioned in the cradle relative to the balance of the incorporating carrier. These detrimental effects can include accentuated swinging or translational movement of the carried articles which can scratch the transporting vehicle, or worse, if not prevented by an interference component such as an end cap, the cradle, including whatever it is carrying (bicycle) may slide free of the arm and be lost from the vehicle.

At least one solution which has been employed and which is not susceptible to creep is the utilization of a screw or similar device that causes an interference connection between a cradle and arm. This, however, is an inadequate solution in that it not only fixes longitudinal movement of the cradle along the length of the arm (but which is sometimes desired), but rotational movement of the cradle on the arm is also prevented, and which is often similarly desired by the user. Essentially preventing these two adjustment aspects substantially compromises the utility of such carriers to consumers.

As may be appreciated from the discussion hereinabove, once a cradle is installed upon the arm of a load carrier, it may very likely be desirable that the cradle not have to be removed from the arm in order to reconfigure the carrier, or accessorize the cradle arrangement. One particular instance is the incorporation of anti-sway devices with such cradle arrangements that are used to stabilized carried cargo during transport. Known devices for these purposes typically require that the cradle be removed from the arm, and the anti-sway device and cradle be reinstalled together in their combination by sliding the anti-sway device and cradle back onto the arm in a direction that is substantially parallel to the longitudinal axis of the arm. This drawback is one which the presently disclosed anti-sway invention remedies.

In view of these observations, a need obviously exists for improved designs of anti-sway devices that can be installed in conjunction with a bicycle cradle without requiring that that cradle be removed from the arm in the process. A similar need is associated with removal such anti-sway devices.

SUMMARY OF THE INVENTION

In an effort to alleviate the detrimental and deficient effects described above, several inventions, or at least aspects thereof, are herein disclosed and which incorporate a plurality of beneficial and advantageous aspects for a load carrier arrangement.

In at least one embodiment, the invention takes the form of a load carrier arrangement for transporting a bicycle when secured thereupon. The load carrier arrangement comprises (includes, but is not necessarily limited to) a frame assembly adapted to be mounted to the carrying vehicle. The frame assembly has at least one elongate arm configured to receive a bicycle cradle thereupon. The bicycle cradle (anchor means) is mounted upon the arm and is operator configurable between a bicycle transporting configuration (either actually laden with an article, or readied for loading thereof) and a non-transporting configuration. The cradle has a through-passage within which the elongate arm is received and the cradle is operator reciprocal (moveable back and forth) on the elongate arm in the non-transporting configuration thereby facilitating variable longitudinal (along the length of) positioning of the cradle by the operator upon the arm. The cradle has an increased resistance to longitudinal reciprocation on the elongate arm in the bicycle transporting configuration in comparison to the non-transporting configuration. In this manner, the cradle is effectively (not absolutely, but under normal circumstances bearing loads for which the carrier has been designed) longitudinally fixed on the elongate arm in the bicycle transporting configuration to an extent that a secured portion of a carried bicycle (for example, a portion, C, of the bicycle's, B, frame, F) in the cradle is longitudinally fixed relative to the elongate arm during transport on the load carrier arrangement.

In an alternative configuration, the invention takes the form of a method for providing a load carrier arrangement for transporting a bicycle when secured thereupon. The method comprises utilizing a load carrier arrangement having a frame assembly mounted to a carrying vehicle and that includes an elongate arm configured to receive a bicycle cradle thereupon to transport a bicycle. The bicycle cradle is operator configurable (can be changed from one to the other) between a bicycle transporting configuration in which the cradle is tight-fitting upon the arm and a non-transporting configuration in which the cradle is comparably loose-fitting upon the arm. At least one step contemplated with regard to this embodiment of the invention includes reconfiguring the bicycle cradle to the non-transporting configuration after transporting use (carrying a bicycle on the carrier) and thereby limiting strain induced, cold-flow creep in the bicycle cradle that results in a reduction of tightness of fit of the cradle upon the arm to periods when the bicycle transporting configuration is assumed.

In a related aspect, the invention is characterized by preserving a designed tightness-of-fit of the cradle upon the arm during bicycle transporting configuration by the limitation of strain induced, cold-flow creep in the bicycle cradle.

In at least one embodiment, the cradle is made up of a plurality of cradle pieces.

In another aspect, the through-passage is constituted by a series of apertures, one each located in a plurality of the cradle pieces.

In a related aspect, the series of apertures constituting the through-passage are sufficiently aligned (not necessarily absolutely aligned, or even of the same sizes) in the non-transporting configuration to achieve the facilitation of variable longitudinal positioning of the cradle by the operator upon the arm.

In another related aspect, at least one of the series of apertures constituting the through-passage is sufficiently misaligned in the transporting configuration to establish a binding effect between the cradle and the elongate arm and thereby effects the longitudinal fixation of the cradle on the elongate arm in the bicycle transporting configuration.

In a further related aspect, transition of the cradle from the non-transporting configuration to the bicycle transporting configuration establishes a binding effect between the cradle and the elongate arm sufficient to establish an anchor for a secured portion, C, of a carried bicycle, B, in the cradle during transport.

In another aspect, the cradle comprises a plurality of variably configurable cradle portions (each being either one piece or multiple piece), at least one of which constitutes a binding assembly that more forcefully abuts the elongate arm in the bicycle transporting configuration than in the non-transporting configuration.

In a related aspect, the binding assembly comprises a binding portion coupled to a lever portion through which a binding force is communicated that fixes the cradle to the elongate arm in the bicycle transporting configuration.

In an alternative aspect, the binding assembly comprises a lever through which a binding force is communicated that fixes the cradle to the elongate arm in the bicycle transporting configuration.

In another aspect, the through-passage comprises a series of apertures, at least one of which is configured in the non-transporting configuration to accommodate reciprocation of the elongate arm therein and is reoriented in the bicycle transporting configuration to bind on the elongate arm and resist reciprocation of the elongate arm therein.

In yet another aspect, different portions of the cradle are constructed from different durometer materials.

In a related aspect, at least one portion of the cradle is constructed from a plastic susceptible to cold-flow creep.

In yet another aspect, portions of the cradle establishing a tightenable fit to the arm are constructed from a material susceptible to cold-flow creep, the portions experiencing creep effects when tightened upon the arm in the bicycle transporting configuration and the portions experiencing reduced creep effects when loosened upon the arm in the non-transporting configuration in comparison to when in the bicycle transporting configuration.

In a related aspect, the material of construction is plastic.

In yet another aspect, the cradle further comprises a base for receiving a bicycle frame tube and a variably adjustable, flexible retaining strap for anchoring the bicycle frame tube in the base.

In a related aspect, the base further comprises a ribbed bicycle-engaging surface for resisting twisting action of the bicycle frame tube in the base.

In an alternative aspect, the base further comprises a fastening tab and the retaining strap comprises fastening holes that cooperatively constitute a custom-fit securement mechanism for anchoring a bicycle in the cradle.

In another aspect, the cradle comprises a plurality of variably configurable cradle portions, at least one of the cradle portions being a binding assembly that more forcefully abuts the elongate arm in the bicycle transporting configuration than in the non-transporting configuration, the binding assembly being actuated by a flexible retaining strap configured to releasably anchor a bicycle frame tube in the base.

In another aspect, the through-passage is variably constricting upon the arm between the bicycle transporting configuration and the non-transporting configuration.

In a related aspect, the variable constriction of the through-passage upon the arm is actuated by a flexible retaining strap configured to releasably anchor a bicycle frame tube in the base.

In a further related aspect, the flexible retaining strap acts on a binding portion of the cradle via a lever portion through which a binding force is communicated and that fixes the cradle to the elongate arm in the bicycle transporting configuration.

In yet another aspect, several unique cradle arrangements have been disclosed. Among other features, one design is described in which the more dislocation-tending force that is exerted upon the cradle, the greater the anchoring power of the cradle to the carrier.

Another feature that is disclosed herein is the unique design for associating a load carrying member, such as a bicycle support arm, with the hub upon which it operates. According to one aspect of the disclosed inventions, a socket is provided in the hub that is designed to insertably receive an insert portion of a load carrying member such as a bicycle support arm. The carrying member is arranged to rotate or twist within the socket. In this way a unique and elegant solution is provided for transitioning such an arm between an extended load carrying or transporting orientation and a compacted storable orientation. It also provides a simple method for making adjustments to the relative orientation of the arm with respect to the balance of the carrier. For instance, if the arm needs to be lowered slightly to be placed in a horizontal orientation when mounted upon a particular vehicle, merely performing a twist of one or both of the arms can provide a quick solution. Similarly, the arms of a pair on a carrier can be leveled; this is enabled by the fact that the arms can be independently adjusted without any changes at the hubs other than permitting rotation of the inserted portion of the arm being manipulated in its socket in the hub.

Because a simple locking arrangement is employed, namely the disclosed spring-biased pin-in-aperture configuration, both the extended and retracted configurations of the carrying members or arms are easily locked and unlocked by an operator. Still further, because of this simple arm-in-socket and biased insert pin arrangement, the carrying member or arm is easily removed from the hub simply by disengaging the locking pin by pulling it against its biasing spring from mating engagement with the receiving apertures on the arm, and then pulling the arm out of the socket. This greatly facilitates shipping where compact packing is of paramount importance.

The construction of the hub arrangement of the exemplary embodiment of FIG. 13 in which essentially two halves are simply joined together saves manufacturing costs and reduces the number of parts required to establish a working hub assembly.

In another aspect, another simple pin-in-aperture configuration is utilized for establishing proper fit of certain frame components relative to the hub of the carrier.

Still further, a scheme for providing a universal fit guide which can be utilized by a number of carriers is disclosed. By using like indicators on differently configured carrier orientation-fixing arrangements, such as the at least two different and alternative hub configurations that are described herein, a single universal fit guide can be produced which specifies one correlator or indicia for a particular fit, which will normally correspond to a particular vehicle, or group of vehicles, and which appears on the several different carriers. Arrangement of any of the properly marked carriers according to the single specified indicia for a particular fit, such as to a particular vehicle, will result. In this way, substantial economies can be realized through the uniformity fostered across different products when a single fit guide can be used for all.

In another aspect, the securing strap is configured with respect to the base of the cradle so that the strap extends substantially upward and away from the base, and is maintained in that orientation until purposefully bent over for securing a bicycle frame to the cradle. In this way, the strap is continuously readied for securement, but out of the way from and clear of the exposed surface of the base upon which a user must install a bicycle to be transported thereupon. To achieve this performance, the material of construction for the strap is selected so that it is sufficiently rigid to support its own weight in a substantially upright orientation when substantially unaffected by external forces, while at the same time being sufficiently flexible to be bent over the bicycle frame member that is to be secured upon the cradle after proper positioning of the bicycle thereupon.

In the embodiments of the several inventions that are disclosed herein and their various combinations, it is contemplated that the carrier may be associated with a transporting vehicle in a number of ways. The carrier may be directly connected to the rear of the vehicle. Alternatively, the carrier may be coupled to the vehicle with one or more components interposed therebetween. As an example, the carrier may be secured to a hitch assembly that is in turn connected to the vehicle. In any event, when aspects of the inventions are described herein as being mounted to, secured to, or otherwise associated with a vehicle, it is to be understood that the association may be direct or indirect with intermediate components therebetween.

In summary, inclusion of one or more of the above described features in a sports equipment carrier enhances the carrier's usefulness, its compatibility with variably configured carrying vehicles, and its ease of manufacture, installation and use.

BRIEF DESCRIPTION OF THE DRAWINGS

Certain embodiments of the disclosed inventions will now be described in greater detail and exemplarily shown in the associated drawings in which like and correlating reference numerals have been used to indicate like and similar components, arrangements of components, and functional features of the same. The illustrative drawings disclose exemplary, and in some case alternative embodiments of the inventions, and in which regard.

MODE(S) FOR CARRYING OUT THE INVENTION

As required, detailed embodiments of the presently disclosed inventions are described herein; however, it is to be understood that the disclosed embodiments are merely exemplary of the inventions that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the inventions.

Figure 1:
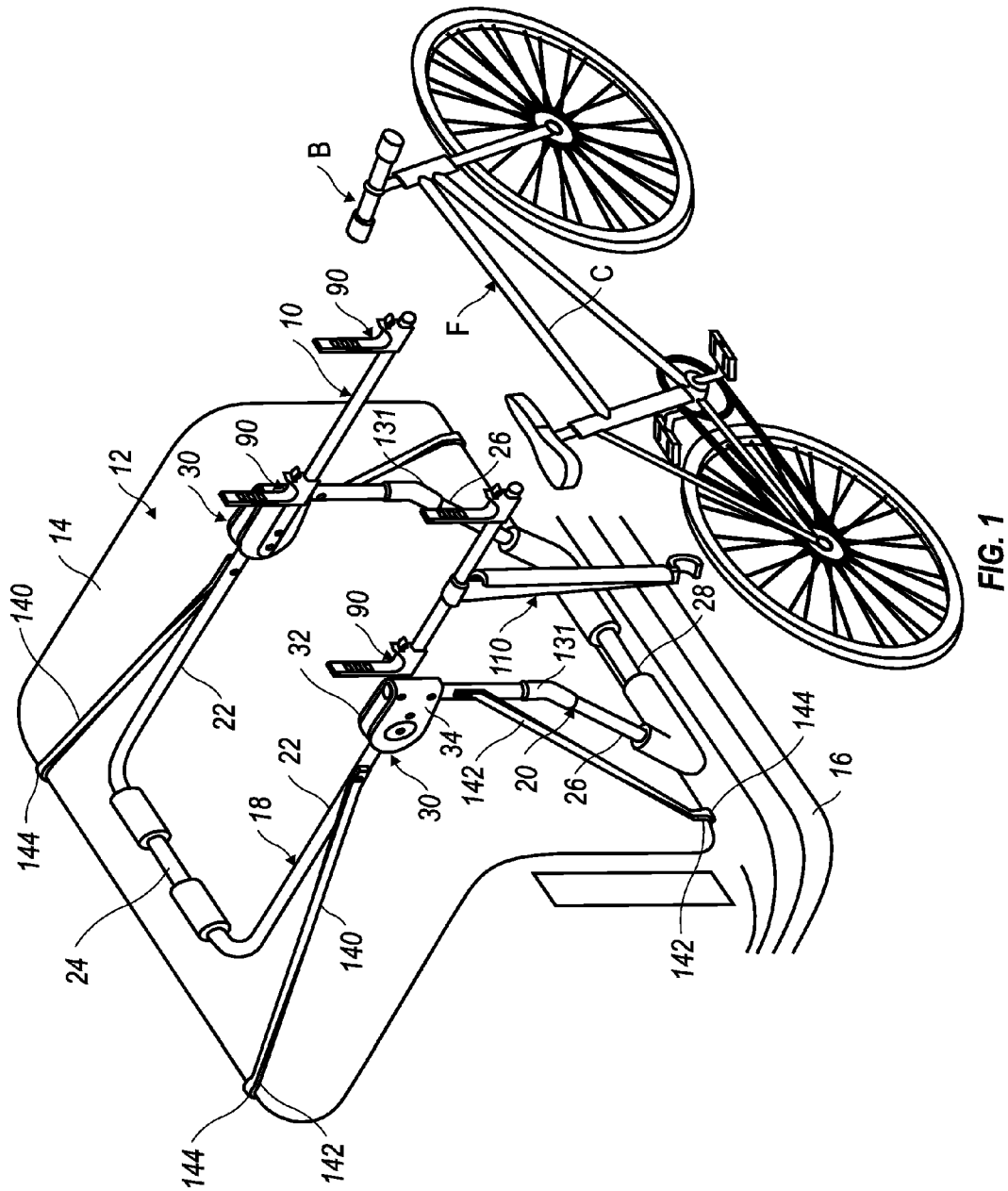
FIG. 1 is a perspective view of a bicycle carrier designed to be mounted on the rear end of a vehicle.

Referring to the Figures, one exemplary embodiment of a bicycle carrier 10 is shown in FIG. 1 as being mounted on the rear of a vehicle 12. The vehicle 12 includes a trunk lid 14 and a bumper 16.

The carrier 10 comprises a frame formed by a pair of mounting members 18, 20, and a pair of bicycle supporting arms 21, 21' project rearwardly from the frame. An upper one of the mounting members 18 is U-shaped and comprises a pair of leg portions 22 interconnected by a bight portion 24. Likewise, a lower one of the mounting members 20 is U-shaped and includes a pair of leg portions 26 interconnected by a bight portion 28.

The mounting members are interconnected by two pivot-forming structures 30, each of which includes first and second brackets 32, 34. The first bracket 32 is affixed to the upper mounting member 18, and the second bracket 34 is affixed to the lower mounting member 20.

Figure 10:
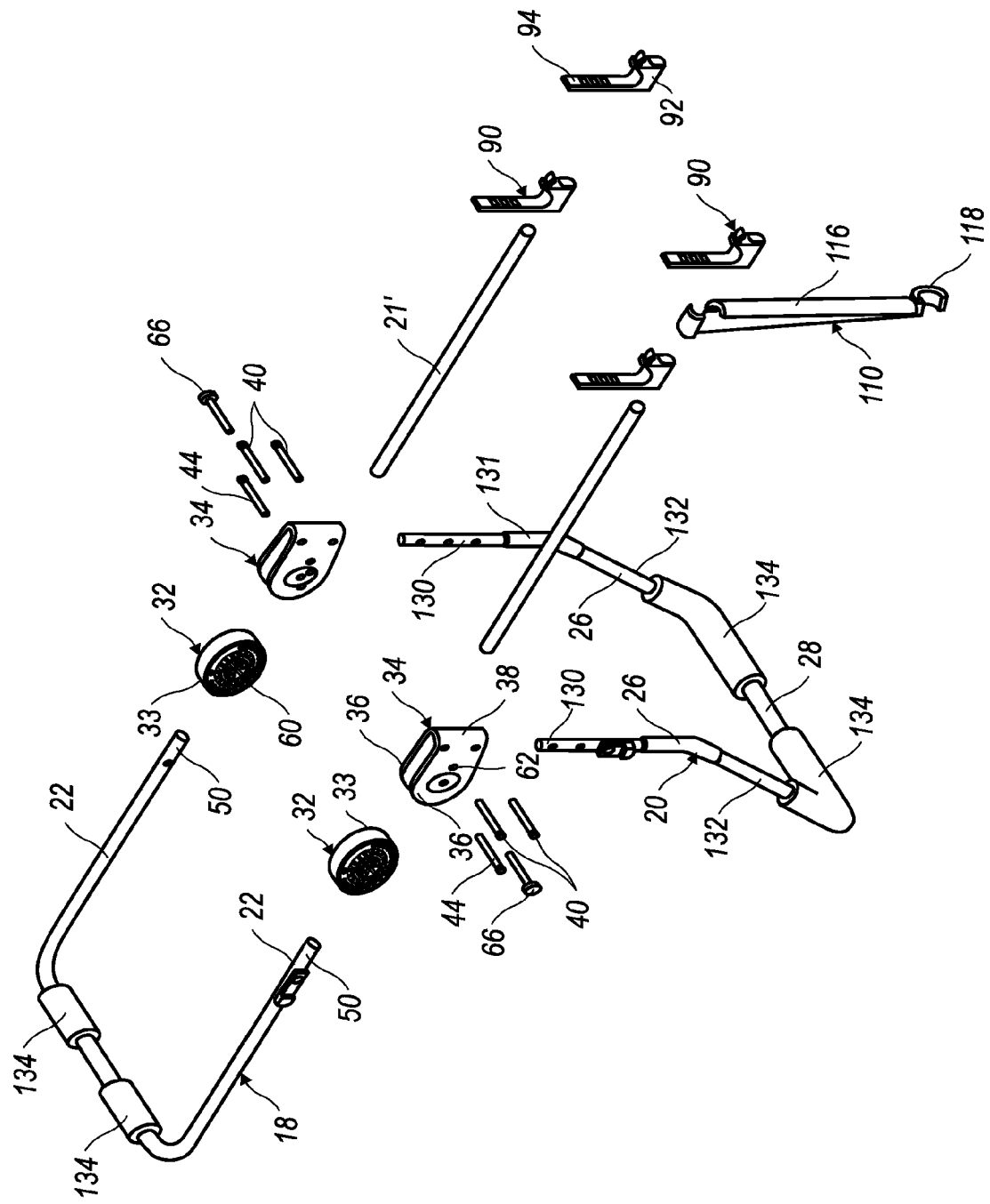
FIG. 10 is an exploded perspective view of the bicycle carrier depicted in FIG. 2 with the cradles disposed in an unaffected, bicycle-receiving configuration.
Figure 11:
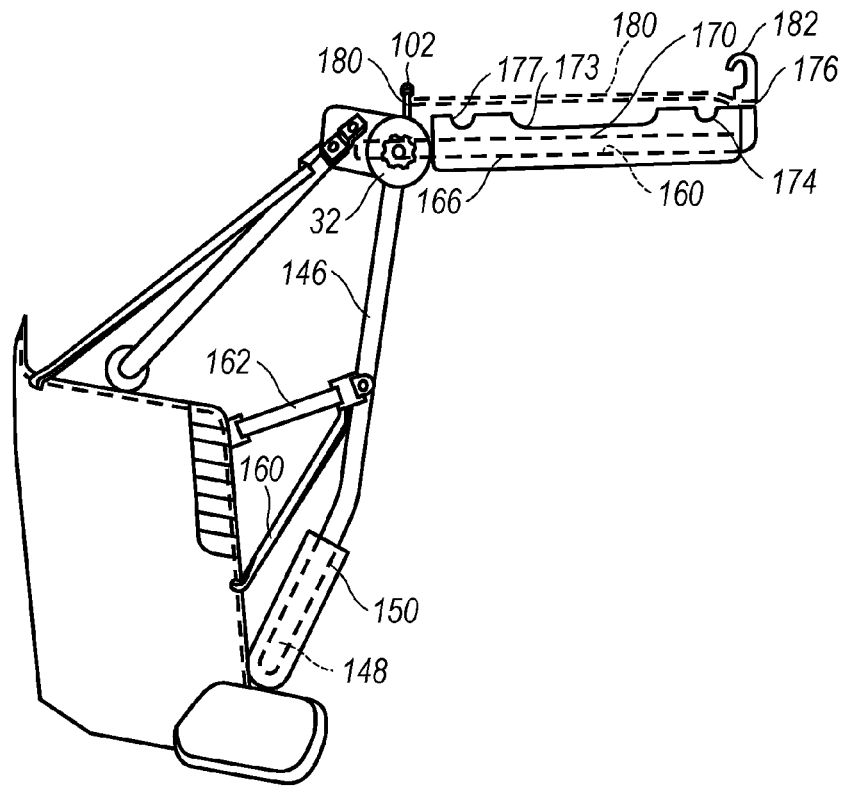
FIG. 11 is a side elevational view of a previously known design in which an elastic cord is utilized in an effort to retain bicycles on a carrier.
Figure 12:
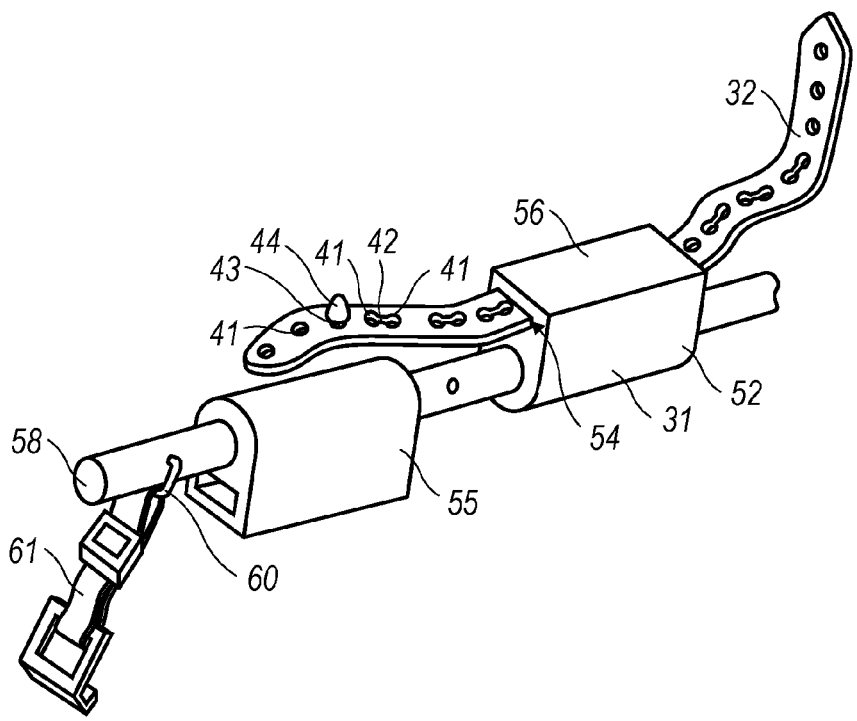
FIG. 12 is a perspective view of a previously known design for an equipment support utilizing flexible belting in conjunction therewith.

The second bracket 34 is U-shaped and includes a pair of leg portions 36 (see FIGS. 8 and 10) interconnected by a bight portion 38. The bight portions 38 forms a socket which receives the upper end of a leg portion 26 of the lower mounting member 20 and retains the leg portion by means of pins in the form of rivets 40 which pass through aligned holes in the leg 26 and leg portion 36.

Figure 3:
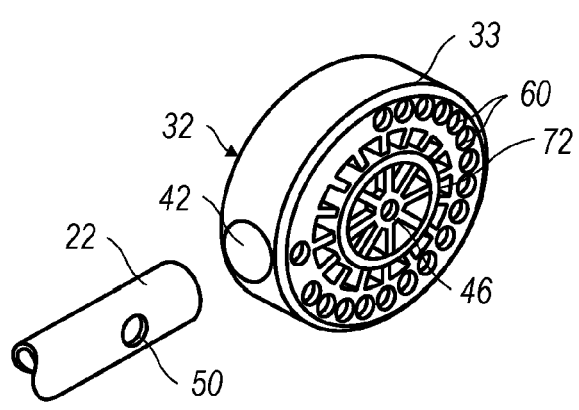
FIG. 3 is a perspective view of a hub portion of that carrier, and a fragment of a leg of a mounting member which is to be inserted into a socket of the hub.
Figure 8:
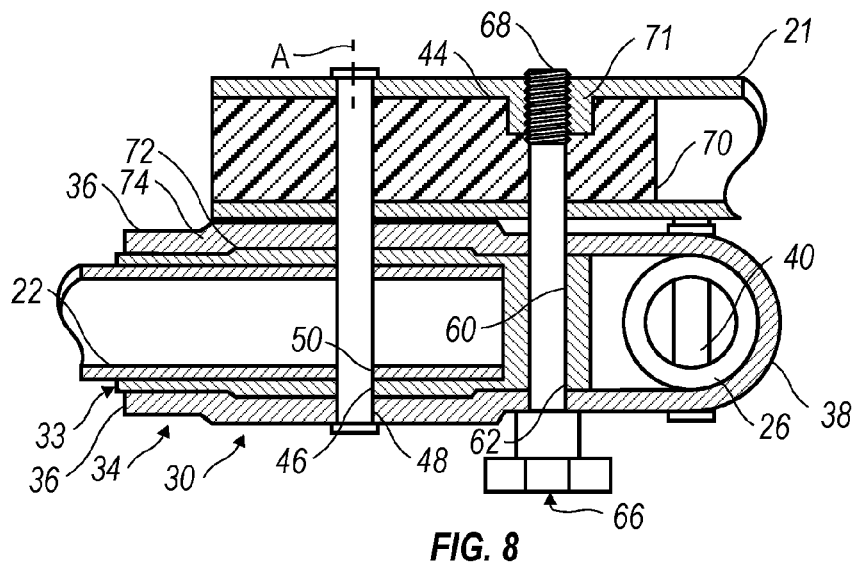
FIG. 8 is a sectional view taken along the line 8-8 in FIG. 7 after a leg of an upper mounting member has been inserted into a hub of the pivot-forming mechanism.

Each of the first brackets 32 comprises a generally cylindrical hub 33 having a radially extending socket portion 42 for receiving a leg portion 22 of the upper mounting member 18 (see FIG. 3). A pin in the form of a bolt 44 extends through aligned openings 46, 48, 50, 52 formed in the hub 33, the bracket 34, the leg 22, and the supporting arm 21 (or 21'), respectively, as shown in FIG. 8. The pin forms a pivot axis A about which the hub 33 can rotate relative to the bracket 34.

An internal wall of the socket 42 could include a projection (not shown) sized to enter a groove formed in an outer wall of the leg to aid in properly aligning the leg within the socket. The hub 33 includes a plurality of through-holes 60 (see FIG. 6) arranged in a circular path concentrically about the pivot axis A. The legs 36 of the bracket 34 include two aligned holes 62 (see FIGS. 7 and 8) spaced from the axis A by the same distance as the holes 60. Hence, by rotating the hub 33 about the axis A, the holes 60 can be brought sequentially into alignment with the aligned holes 62. By inserting a threaded bolt 66 through the aligned holes 62, 60 and into a threaded hole 68 disposed within the supporting arm 21 (or 21'), the mounting members 18, 20 will be locked in a particular adjusted position. This enables a number of possible positions. The threaded hole 68 can be provided in the supporting arm 21 (or 21') in any convenient fashion, such as by means of a polypropylene plug 70 affixed within the supporting arm 21.

The plug 70 includes holes through which the rivet 44 and bolt 66 extend, and carries a threaded nut 71 which receives the bolt 66.

Figure 9:
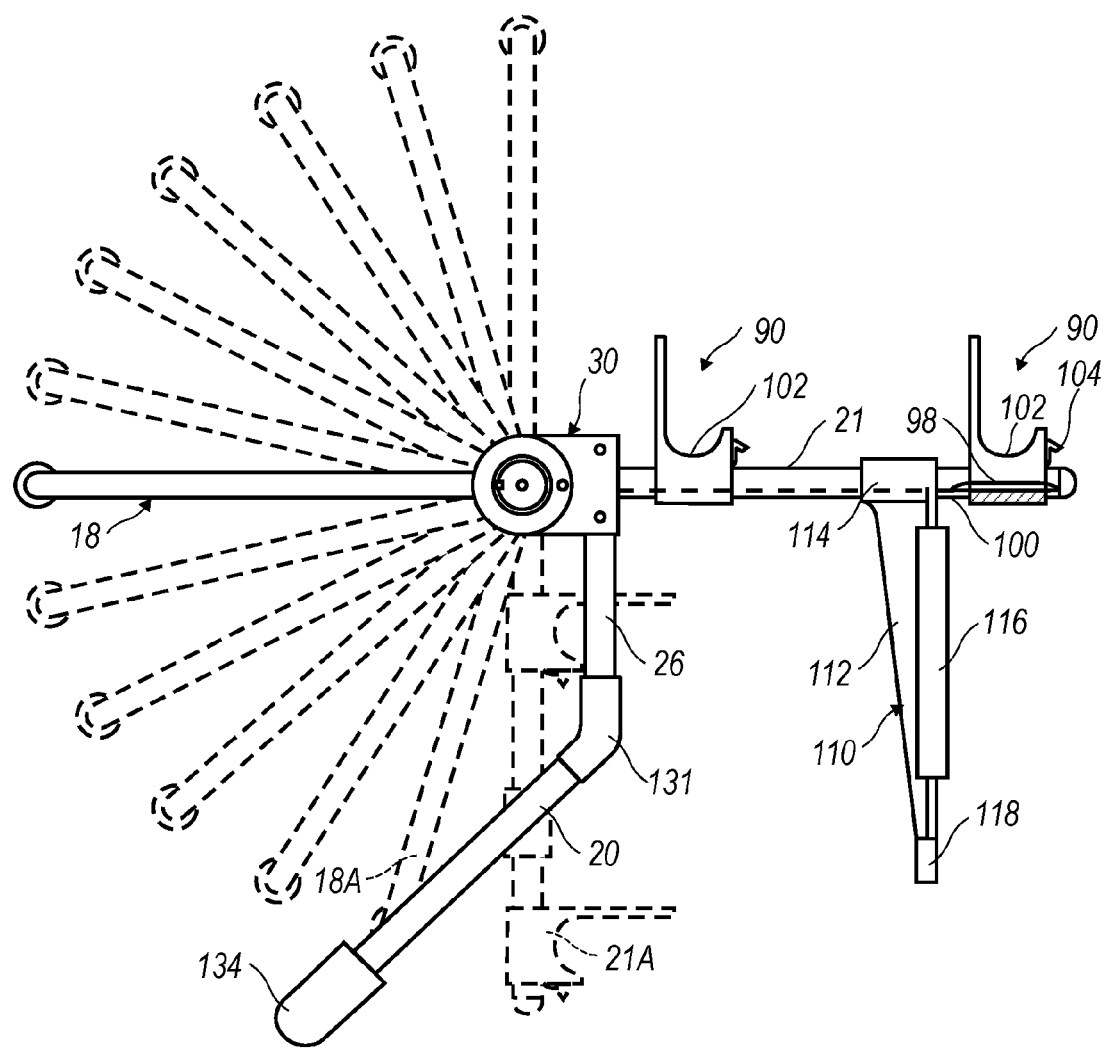
FIG. 9 is a side elevational view of the carrier, depicting various positions of adjustment of that carrier in broken lines.

The hole 62 of the bracket 34 and the hole 68 of the supporting arm 21 are located such that when the supporting arms 21, 21' are in their use position, they are oriented substantially perpendicular to the upper portions of the legs 26 of the mounting member 20 as the carrier is viewed from the side in a direction parallel to the axis A (see FIG. 9).

Rotational support for the hub 33 within the bracket 34 is enhanced by the engagement between a circular projection 72 formed on each of the outer surfaces of the hub, and a circular recess 74 formed in each of the inner surfaces of the bracket legs 36 (see FIG. 8). The engagement between those projections and recesses 72, 74 forms a rotary support between the hub 33 and bracket 34.

Figure 7:
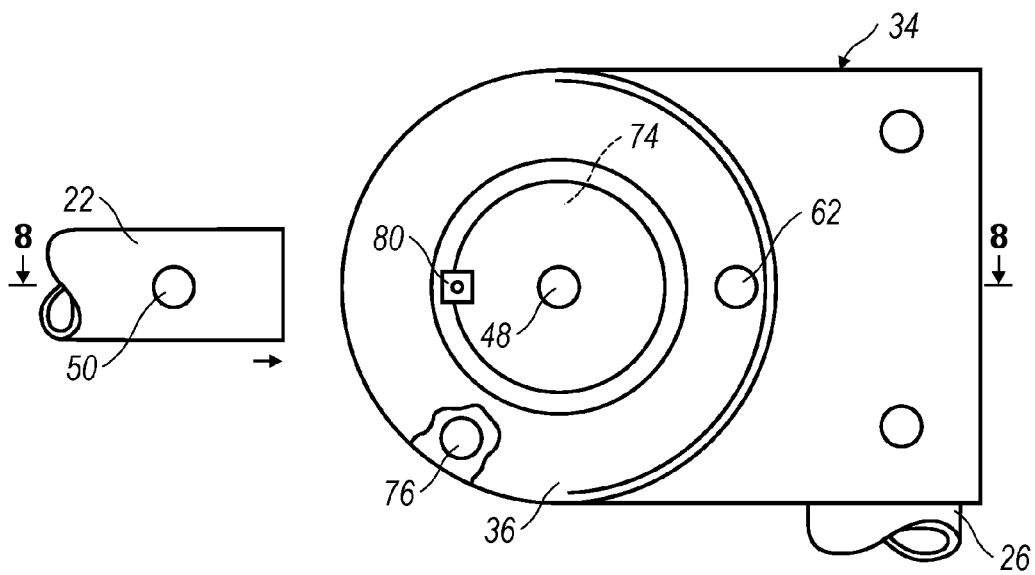
FIG. 7 is a side elevational view of a portion of that carrier which forms a pivot connection between two mounting members of the carrier.

In order to enable alignment between the holes 60 of the hub 33 and the holes 62 of the bracket to be more easily attained, each of the inside surfaces of the bracket 34 is provided with a projection 76 which is spaced from the axis A by the same distance as the holes 60 of the hub are spaced from that axis. In FIG. 7 a part of one of the legs 36 is broken away to show the projection 76 located on the opposite leg 36. Thus, as the hub 32 rotates, the holes 60 will sequentially become aligned with, and receive, the projections 76. The projections do not lock the hub in its various positions of adjustment, but merely offer a yieldable resistance against further hub rotation. The projections 76 are located such that when they are nested within one of the holes 60, another of the holes 60 will be aligned with the holes 62 of the bracket, as depicted in FIG. 8, thus facilitating insertion of the bolt 66 to lock the carrier in that particular adjusted position.

It will be appreciated that when relative rotation about axis A occurs between the upper and lower mounting members 18, 20, such as when changing from one adjustment position to another, the angle formed between those mounting members changes, as is evident from FIG. 9 which depicts various adjusted positions of the carrier in broken lines. In so doing, the carrier 10 is capable of being mounted on the rears of vehicles of different configurations. Thus, each position of adjustment is suited to one or more particular vehicle model. When a user attempts to re-attach the carrier to a vehicle, or transfer the carrier from one vehicle to another, it would be highly inconvenient to have to repeat the time-consuming procedure of experimenting with different adjustment positions of the carrier.

Figure 6:
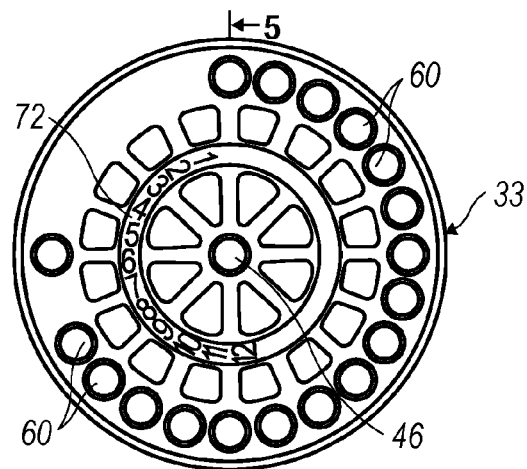
FIG. 6 is a side elevational view of the hub depicted in FIG. 3.

In order to avoid that inconvenience, an aspect of the invention provides means for identifying the various adjustment positions. As depicted in FIG. 6, indicia in the form of a series of numbers, i.e., numbers 1 through 12, is disposed on one of the sides of the hub 33. Those numbers are arranged in a circular path which is concentric with the axis A. One of the legs 36 of the bracket 34 includes an opening 80 (see FIG. 7) which is spaced the same distance from the axis A as are the numbers formed on the hub. The opening is situated so that whenever the mounting members have been indexed to any one of their adjusted use position (excluding a storage position), a number is visible through the opening 80. For example, the number "6" is visible in FIG. 7.

The numbers can be provided in any suitable manner, such as by being integrally molded with the hub and then colored in an appropriate manner so as to be clearly distinguishable.

Hence, once a user has adjusted the carrier to suit a particular vehicle, the user need only record the particular position number which is disposed in the opening 80 in order to be able in the future to quickly return the carrier to the position suited to that vehicle. If the user owns a number of vehicles, then he will record the position numbers pertinent to each vehicle.

Furthermore, it is possible for the manufacturer of the carrier to provide the user with a listing which correlates various vehicle models to the position numbers. Hence, upon purchasing the carrier, the user can immediately index the carrier to its proper position without the need to experiment with different positions.

Figure 4:
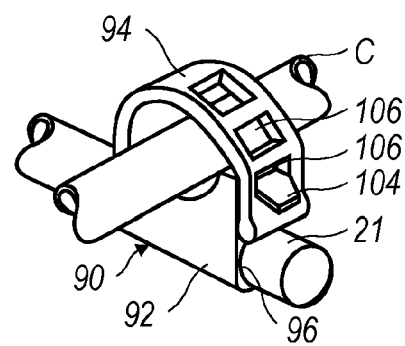
FIG. 4 is a fragmentary perspective view of a cradle of that carrier, the cradle being in a bicycle frame-retaining condition.
Figure 5:
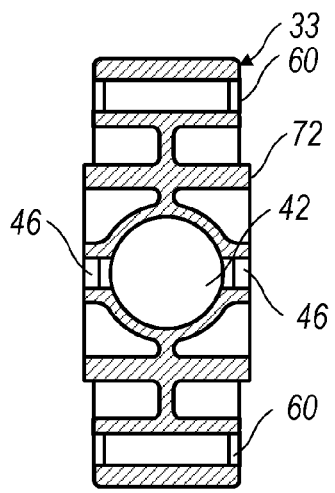
FIG. 5 is a cross-sectional view taken through the hub along the line 5-5 in FIG. 6.

In order to support a bicycle B without scratching the frame, bicycle-receiving cradles 90 formed of an elastically flexible material, such as rubber or soft plastic, are provided to receive and cradle a bar or portion C of the bicycle frame F. Each cradle 90 includes a base 92 and a strap 94 which are of integral, one-piece construction. The strap 94 normally extends substantially upwardly from the base 92 as shown in FIGS. 1, 2, 9 and 10, but can be flexed to extend across a bicycle receiving surface 102 of the cradle 90 to retain a bicycle frame, as shown in FIG. 4. The base 92 includes a through-hole 96 which is adapted to receive a supporting arm 21 (or 21'). The supporting arm makes a snug frictional fit with the hole 96, so the cradle 90 can be slid along the supporting arm and then be held in position by friction.

A wall of the through-hole 96 includes a projection 98 which is received in a longitudinal channel 100 formed in an outer surface of the supporting arm 21 (or 21'). The projection tends to retain the cradle in a prescribed circumferential position on the supporting arm, so that the bicycle-receiving surface 102 of the cradle faces upwardly.

That surface 102 is formed on the base 92 and is of curved shape to generally conform to the curvature of the bar C of the bicycle frame. The base 90 carries a metal fastener tab 104 which is disposed on a side of the surface 102 opposite that of the strap 94. The tab 104 can be mounted in the base in any suitable fashion.

The strap 94 includes a plurality of fastening holes 106 (see FIG. 4) which are sized to receive the tab 104. Thus, once the bar C of the bicycle frame has been placed onto the surfaces 102 of two of the cradles, the straps 94 are wrapped around the bar C and fastened to the tab 104, as depicted in FIG. 4. The bar C will be held in place without any metal-to-metal contact which could scratch the bar.

Two pairs of cradles 90 can be provided to enable two bicycles to be supported simultaneously on the supporting arms. During vehicle movement, there may occur a tendency for the bicycles to swing about axes defined by the bars C during movement of the vehicle. In order to prevent bicycle-to-bicycle contact during such swinging movement, there is provided an anti-sway bar 110. The anti-sway bar 110 comprises an arm 112 having a hollow sleeve 114 at its upper end. The sleeve 114 receives a supporting arm 21 to enable the anti-sway bar 110 to be slid longitudinally therealong. Disposed over a front face of the arm 112 is a cover 116 formed of a relatively soft material such as rubber or a soft plastic. At its lower end, the arm 112 is shaped like a hook 118. The anti-sway bar is positioned intermediate the front and rear pairs of cradles and hangs vertically downwardly such that if the bottom of a rear bicycle swings forward toward a front bicycle, the bottom of the rear bicycle will strike the soft cover 116 of the anti-sway bar 110. Consequently, damage to the bicycles as the result of bicycle-to-bicycle contact will be avoided.

The anti-sway bar 110 is longitudinally adjustable along the supporting arm 21 and the sleeve 114 is snugly engaged with the supporting arm 21. By applying sufficient force to the anti-sway bar 110 to overcome the frictional contact with the supporting arm, the position of the anti-sway bar can be changed.

Figure 2:
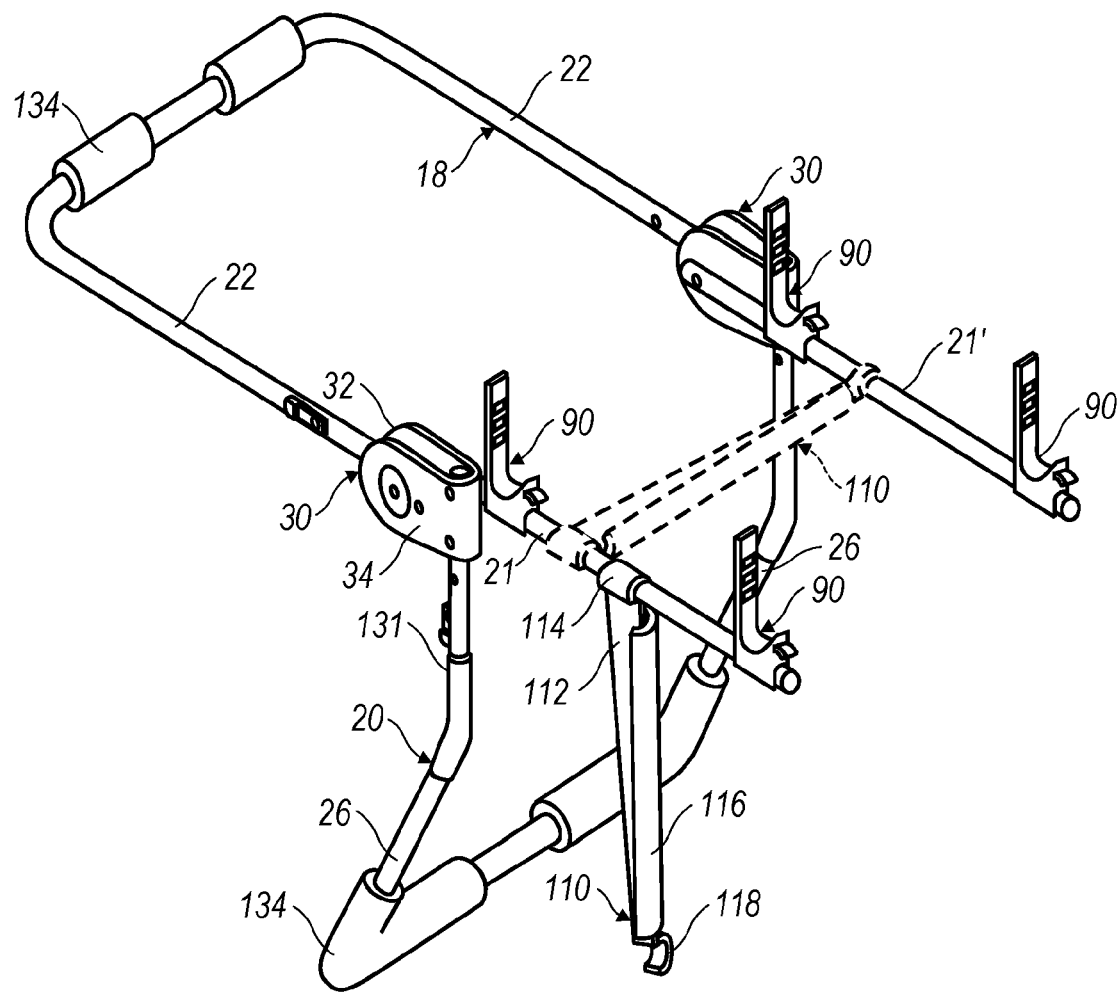
FIG. 2 is a perspective view of that bicycle carrier, with securing straps thereof being deleted for clarity, and with a anti-sway bar shown in phantom lines in a carrier-storing position.

For carrier-storage purposes, the anti-sway bar 110 can be swung about the axis of the supporting arm 21 until the hook 118 snaps onto the other supporting arm 21', as depicted in phantom lines in FIG. 2. Thus, the carrier will be rendered more compact for storage purposes than if the anti-sway bar 110 were permitted to hang free.

While the anti-sway bar 110 limits forward swinging movement of the rear bicycle, the upper portions 130 of the legs 26 of the lower mounting member 20 perform a similar function with respect to a front bicycle. When the carrier has been properly mounted on a vehicle, the upper portions 130 of the legs 26 will be oriented substantially vertically, and the supporting arms 21, 21' (which have only one use position) will be oriented substantially horizontally. Hence, the leg upper portions 130 will be conveniently suited to limit the forward swinging movement of the front bicycle. Pads 131 are provided on the legs 26 to prevent the bicycle from being damaged by the leg portions 130.

If desired, the legs 26 and the anti-sway bar 110 could be provided with straps to enable the front and rear bicycles to be attached to the legs 26 and anti-sway bar, respectively, to prevent swinging of the bicycles.

The lower portions 132 of the legs 26 are inclined inwardly and downwardly from the upper portions 130 to form obtuse angles therebetween. Hence, the bight portion 28 of the lower mounting member 20 will be properly located for engaging the rear bumper of the vehicle, as depicted in FIG. 1.

The vehicle-engaging portions of the carrier are provided with soft cushions 134 to prevent the vehicle from being scratched by the carrier.

The carrier is affixed to the vehicle by means of upper and lower securing straps 140, 142 (see FIG. 1) which carry conventional hooks 144 and adjusting buckles 146. The hooks grasp portions of the vehicle body, such as edges of the trunk lid for example, and are drawn-up tight by means of the buckles. By loosening the straps at the buckles, the hooks can be easily removed.

To render the carrier more compact for storage purposes, the anti-sway bar 110 is swung to its position wherein the hook 118 snaps onto the supporting arm 21'. Then, the bolt 66 is removed to enable the mounting members 18, 20 and the supporting arms 21, 21' to be swung about the axis A so as to lie more closely together. Such a compact condition of the carrier can be visualized in FIG. 9 wherein the lower mounting member could occupy the solid line position shown therein; the upper mounting member could occupy the broken line position 18A; and the supporting arms could occupy the broken line position 21A. While the mounting portions 18, 20 cannot be folded so as to lie in the same plane, they can be folded sufficiently to cause the size of the carrier to be substantially reduced to provide for convenient storage.

Although, not essential, the bracket 34, and the hub 33 could be provided with holes that are aligned in the storage position and which are also aligned with the hole 68 of the supporting arms, so that the bolt 66 can be reinserted to hold the carrier in its storage position.

In operation, when a user desires to install the carrier 10, the bolt 66 is removed, and the frame 18, 20 of the carrier is adjusted to a position fitting a particular vehicle 12 by rotating the mounting member 18 about axis A so that when the carrier rests against the vehicle, the supporting arms 21, 21' extend substantially horizontally. Then the bolt 66 is reinserted, and the hooks 144 of the straps 140, 142 are positioned to grasp convenient edges of the vehicle body in a conventional manner.

The user may now observe and record the position or index number which appears in the opening 80 (FIG. 7), so that, in the future, the carrier can be quickly indexed to that same position. The manufacturer could provide a listing of vehicle models and the corresponding index numbers of the carrier, so that the user would never have to experiment with different positions of the frame.

Once the carrier has been installed, one or more bicycles 83 are mounted on the cradles 90. If two bicycles are to be mounted, the cradles 90 can be adjustably positioned along the supporting arms 21, 21' to space the front and rear pairs of cradles apart by a distance commensurate with the size of the bicycles.

The cradle straps 94 are then wrapped around the bar C of the bicycle frame F (FIG. 4) to provide 360 degree securement of that bar. Due to the soft, elastic nature of the cradle, the bicycle bar C will not contact metal so as to become scratched.

The anti-sway bar 110 (see FIG. 2) is positioned closely adjacent the rear bicycle to resist swinging of that bicycle during vehicle travel, and thereby prevent bicycle-to-bicycle contact.

When the carrier is removed from the vehicle and stored, the anti-sway bar 110 can be rotated to a convenient storage position (see broken lines in FIG. 2) wherein the hook 118 snaps onto the other supporting arm 21'.

Figure 13:
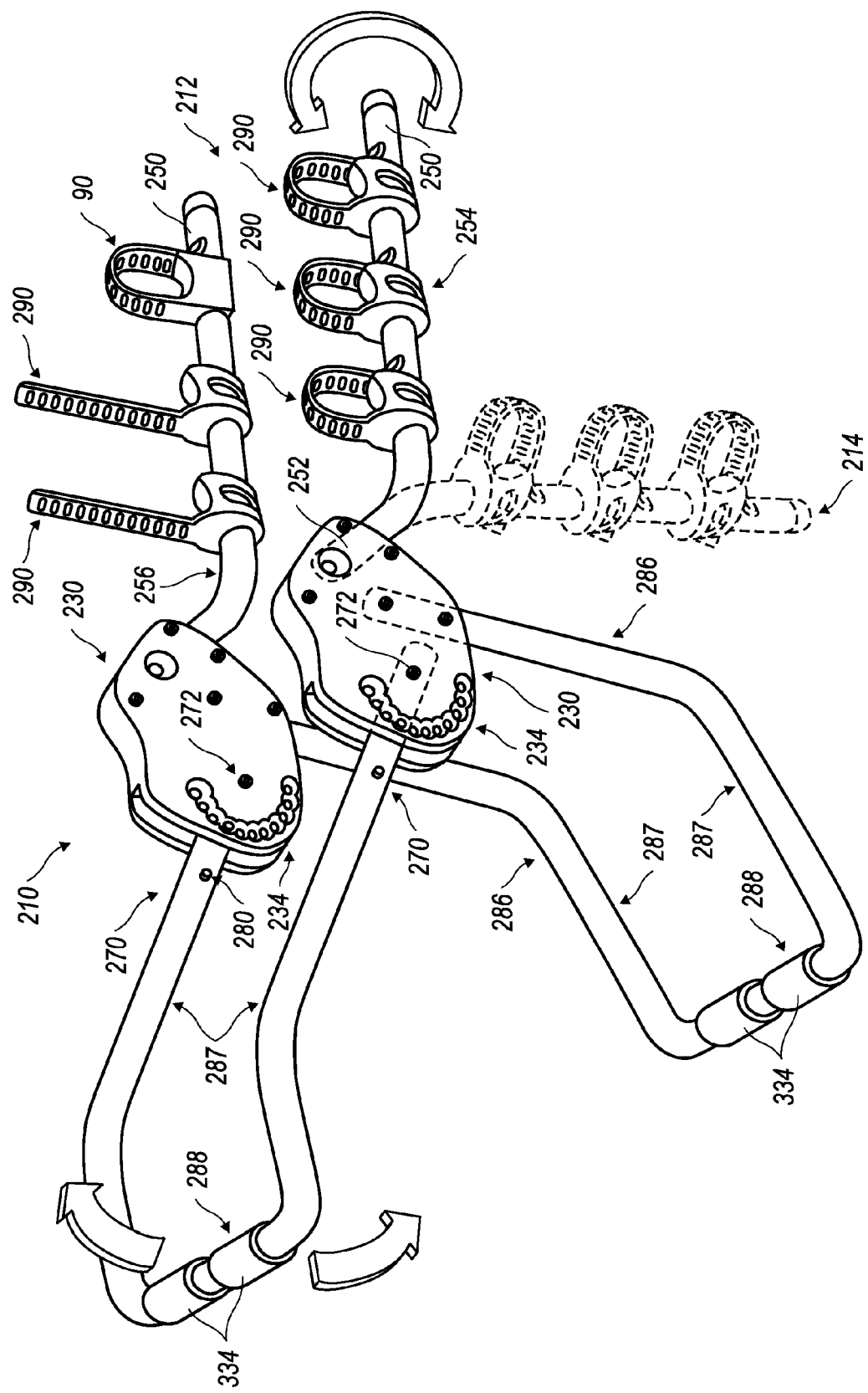
FIG. 13 is a perspective view of an alternative embodiment of a carrier illustrating alternative and/or additional inventions to that embodiment depicted in FIG. 1.

A second exemplary embodiment for a load carrier arrangement 210 is illustrated in FIG. 13 which exemplifies several of the same unique aspects as that depicted in the carrier design shown in FIG. 1, as well as several additional inventive component designs, arrangements and utilizations. The carrier 210 includes a hub 230 that serves as the joining component between a load carrying member 250 and first and second support members 270, 286. Two orientations of the carrier 210 are shown in FIG. 13; in solid lines, two load carrying members 250 are shown projecting to the right in a load carrying orientation 212. In broken lines, the most nearly positioned of the carrying members 250 is shown rotated, or twisted down into a storable orientation 214.

Each of the two load carrying members 250 includes an insert portion 252 and a load carrying portion 254 with an angle 256 interposed therebetween. In one embodiment, the load carrying members 250 are constructed from cylindrical tubing, preferably of metal construction, that has been bent to establish the angle 256.

The hub 230 houses a substantially cylindrically-shaped socket 232 therein. The socket 232 is configured to receive the insert portion 252 of a load carrying member 250. Because relative rotation of the insert portion 252 within the socket 232 is required, both the socket 232 and insert portion 252 are preferably cylindrical in shape. When the word "substantially" is used herein in conjunction with these two components, it is intended that departures from an exact cylindrical shape is possible, but the capability for rotation or twist of the insert portion 252 in the socket 232 must be maintained.

A primary feature of the load carrier arrangement 210 is enabled by the cooperation of the load carrying member 250 in the socket 232 of the hub 230. As has been described hereinabove, in one embodiment, twisting action of the insert portion 252 in the socket 232 transitions the load carrying member 250 from the load carrying orientation 212 to the storable orientation 214. It should be appreciated that while a twist-indicating, double-headed arrow is shown at the distal end of the carrying member 250 in FIG. 13, the twisting action actually occurs about the insert portion 252 of the carrying member 250.

In a preferred embodiment, the angle 256 measures approximately forty-five degrees. As a result, by twisting the insert portion 252 approximately one hundred and eighty degrees, the load carrying portion 254 of the member 250 is transitioned to a substantially perpendicular orientation relative to the starting position. It should be appreciated that more minor twist positioning of the insert portion 252 will result in adjustments to the orientation of the carrying member 250. Therefore, the relative orientation of the load carrying portion 254 can easily be adjusted by a simple twist of the insert portion 252.

A locking arrangement is provided between the hub 230 and the carrying member 250 through the inclusion of a locking pin 236 on the hub 230 and a first receiving aperture 258 on the insert portion 252 of the member 250. When properly positioned within the socket 232 and moved to the load carrying orientation 212, the first aperture 258 is aligned with the locking pin 236 which is then to be inserted therein under the action of an inwardly biasing spring member. Release from this locked configuration is accomplished by an operator grasping a head 237 of the locking pin 236 and retracting the pin 236 from the aperture 258. The operator's grasping of the head 237 is facilitated by a recess 238 in the surface of the hub 230 located about the head 237. In this way, the head 237 is otherwise protected from inadvertent release because it is sunk within the recess 238 below the surface level of the hub 230.

In at least one embodiment, a second aperture 260 is provided in the insert portion 252 of the carrying member 250 at an opposed location to the first aperture 258. This second aperture 260 corresponds to the storable orientation 214 when aligned with the locking pin 236. By insertion of the locking pin 236 into the second aperture 260, a locked storable orientation 214 is achieved. This should be contrasted to known designs in which carrying arms are permitted to pivot or drop out of the carrying orientation, but then they are permitted to flop about without restraint. The capability of the present intention to lock the load carrying member 250 in the storable orientation is a significant improvement over these unrestrained designs.

A plurality of bicycle receiving cradles 290 are shown installed upon each of the carrying members 250. In practice, one or more cradles 290 may be installed on either of the load carrying members 250. As will be addressed in greater detail hereinbelow, an alternative appearance and design is represented by the cradles 290 positioned on the nearest carrying member 250 as shown in FIG. 13. It should be appreciated, however, that the earlier described embodiment for a bicycle receiving cradle 90 may be substituted therefore as is illustrated in the most distally positioned cradle 90 on the farther away carrying member 250 of FIG. 13.

It should be appreciated that the retaining strap 294 portion of the cradle 290 exemplarily extends in a substantially upstanding orientation under unaffected conditions, but may be bent over by an operator and secured to a base 292 of the cradle 290 for establishing a bicycle frame securing configuration of the cradle 290.

Still referring to FIG. 13, but turning to the aspect of the support members 270,286, it should be appreciated that a pair of first support members 287 are joined together by a bight portion 288 which in the aggregate form a substantially U-shaped frame member. As shown, each of the support members 287 cooperates with a hub 230. Padding cushions 334 are positioned upon the bight portion 288 for buffering engagement with the transporting vehicle. As illustrated, a pair of second support members 286 are similarly configured, but differ in their connection to the respective hubs 230 as will be described in greater detail.

Each first support member 270 defines an interior space 271 and is pivotally connected to a hub 230 at a pivotation point 272 by a rivet or similar axle-establishing component. A plurality of apertures 234 are provided in the hub 230 that extend outward from a recess into which the first support member 270 extends into an interior region of the hub 230 and through a wall of the hub 230 to an exterior surface of the hub 230. The apertures are arranged in a series about the pivotation point 272 on a rounded arc.

An insert pin 274 is located on the first support member 270. The insert pin 274 has a projecting portion 275 and a root end 276 that is anchored on a biasing member 278. The biasing member 278 preferably takes the form of a leaf-type spring which is located in the interior space 271 of the support member 270. A through-hole is provided across the wall of the support member 270 that permits the projecting portion 275 of the insert pin 274 to extend outside the member 270. The location of the pin 274 on the member 270 is such that it is aligned with the series of apertures 234 in the hub 230. Because of the spring 278, the insert pin 274 will become engaged into any one of the apertures of the series 234 when ever brought into registration therewith.

In order to facilitate disengagement of the insert pin 274 out of an aperture 234, a push pin 280 similarly configured to the insert pin 274 is depressed by the operator. The push pin 280 is located on the support member 270 at a distance sufficiently far from the pivotation point 272 that the pin 280 is positioned outside the hub 230. The push pin 280 includes a projecting portion 282 and a root end 284 configured with relationship to the spring 278 substantially like to the insert pin 274. Because the push pin 280 is positioned upon the spring 278 substantially adjacent to the insert pin 274, and the effective length of the push pin 280 is greater than the insert pin 274, depression of the push pin 280 causes retraction of the insert pin 274 back into the interior space of the first support member 270 and out of engagement with any aperture 234 with which mating engagement had been previously achieved.

Each of the apertures 234 may be marked to serve as indicia of particular configurations such as fits to certain vehicles. As described hereinabove with respect to the arrangement for providing similar indicia in the alternative embodiment of FIG. 6, fit guides may be generated which show which marked aperture 234 or 60 should be engaged for proper fit to a certain vehicle. This illustrates another inventive aspect disclosed herein; that is, the enablement of a single fit guide being maintained, but which is made universal to a plurality of different carriers because of like indicia marking schemes. That is, like markings are coordinated across several different carriers so when any one of the carriers are set to an indicated marking from the fit guide, the carrier will be set to a configuration appropriate for the looked-up reference, such as the type of vehicle the user desires to mount the carrier upon.

Referring again to FIG. 13, but now turning to the second support member 286, it should be appreciated that a similar configuration is utilized for the second support member 286 as the first support member 270, but the second support member 286 is fixedly anchored in the hub 230 utilizing in the illustrated embodiment, two rivets 240 that also serve to secure two halves of the hub 230 together.

Figure 14:
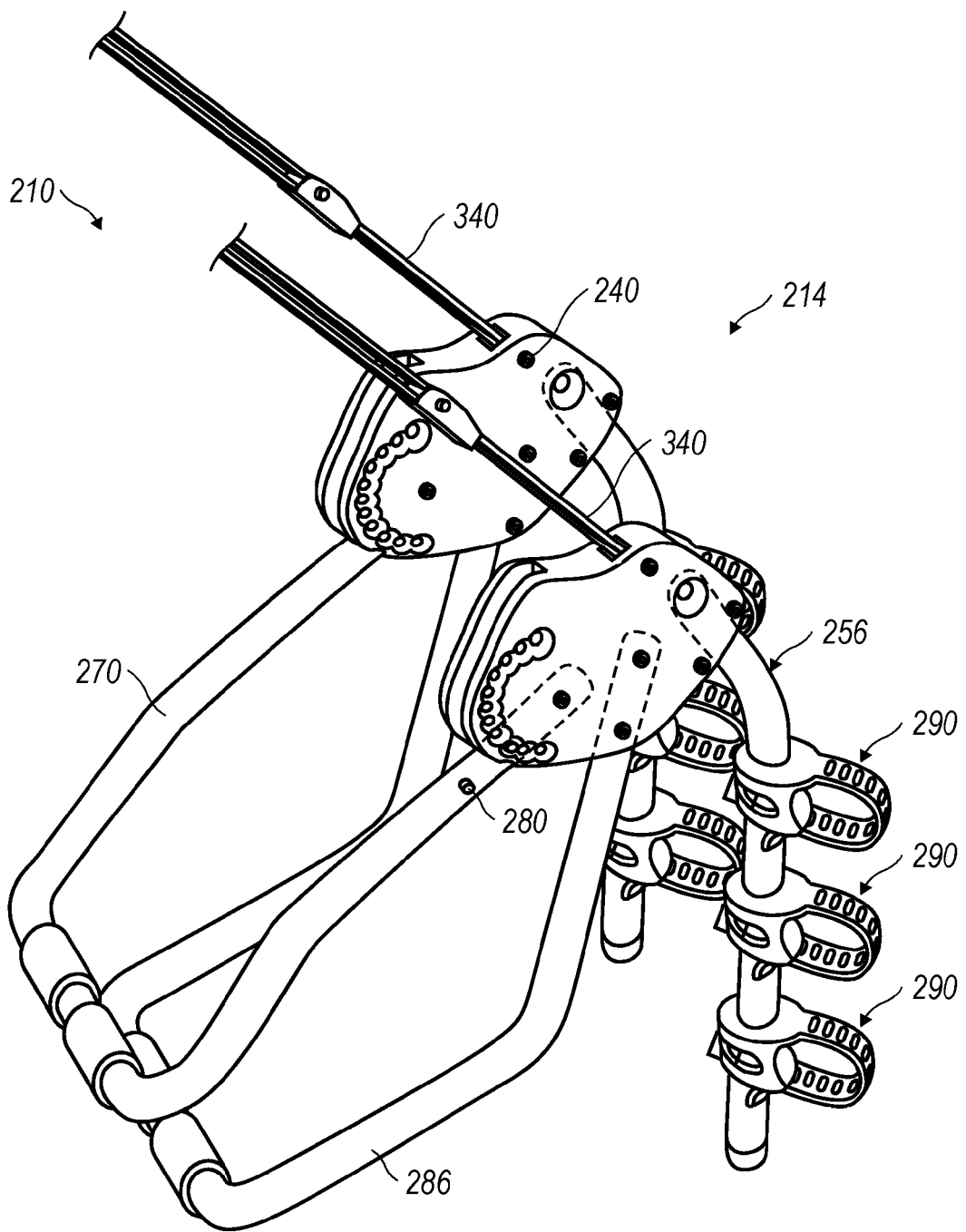
FIG. 14 is a perspective view of that carrier of FIG. 13 shown in a collapsed, ready to be stored or transported orientation.
Figure 19:
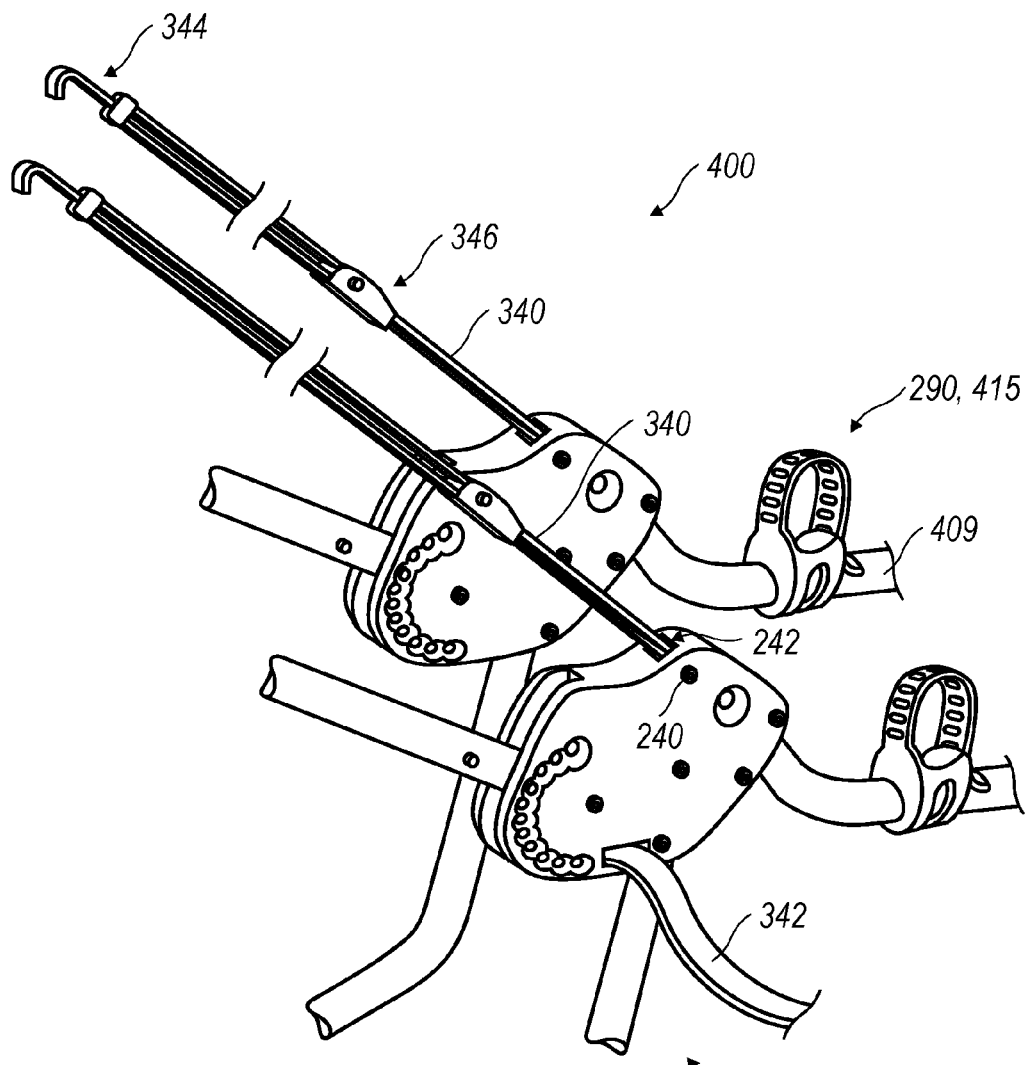
FIG. 19 is a perspective view of a top portion of a carrier hub substantially similar to that shown in FIG. 13 illustrating an anchoring strap secured within the body of the hub by a loop formed in the end of the strap and which is secured by a rivet used in the hub's assembly.

Referring to FIG. 14, the load carrier arrangement 210 may be appreciated as being arranged into the storable orientation 214. Another aspect is depicted in FIG. 14, as well as FIG. 19 regarding a securement arrangement for upper 340 and lower 342 securing straps to the hub 230. From these two figures, a recess into the interior space of the hub 230 at a rivet 240 may be appreciated. The securing straps 340,342 are of conventional design, but with a loop provided at the end connected to the hub 230. The loop is anchored by the rivet 240 which serves as an axle about which the looped-strap is able to twist or rotate. The strap may be looped around the rivet 240, or the rivet 240 may be inserted through the loop during the hub's 230 assembly. In either event, this arrangement for securing an anchoring strap to the hub 230 provides a substantial benefit in that it avoids twisting action traditionally imposed upon the load carrier arrangement 210 when clipped attachment to the vehicle was necessarily attached with inboard or outboard of the hub assemblies. This improved effect is facilitated because the straps are now enabled to extend substantially parallel to a long axis of the hub 230, which is substantially parallel with the long axis of the carrying vehicle, when conventionally designed hooks 344 are secured thereto. As in other conventionally designed cinchable strap arrangements, adjusting buckles 346 are also incorporated for accommodating proper fit to different vehicles.

Figure 15:
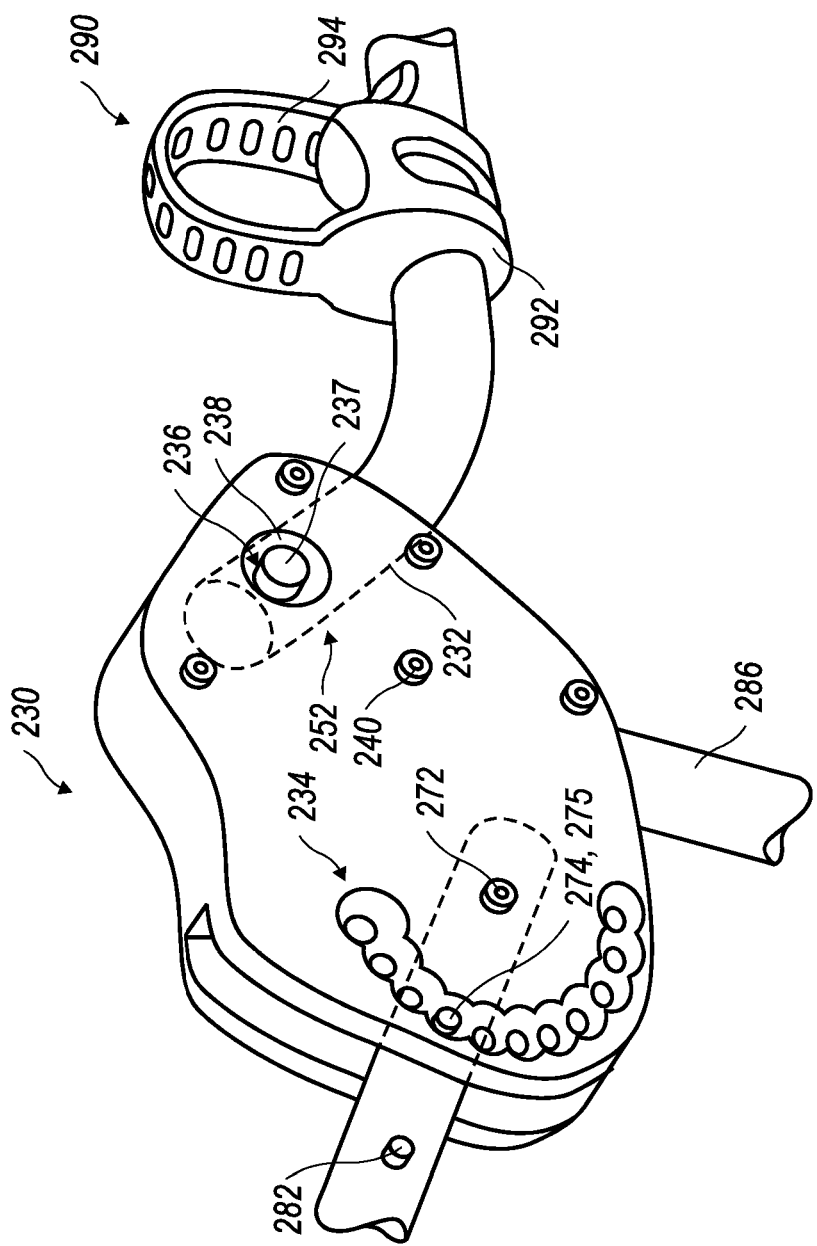
FIG. 15 is a detailed perspective view of the hub of that carrier of FIG. 13 showing certain internal features in broken lines.

FIG. 15 is provided to illustrate the details of the unique arrangement of the hub 230. It should be appreciated that two such hubs 230 are included in the load carrier arrangement 210. The uniqueness of the individual hub arrangement 230 is, however, considered to be an inventive design in and of itself.

Figure 16:
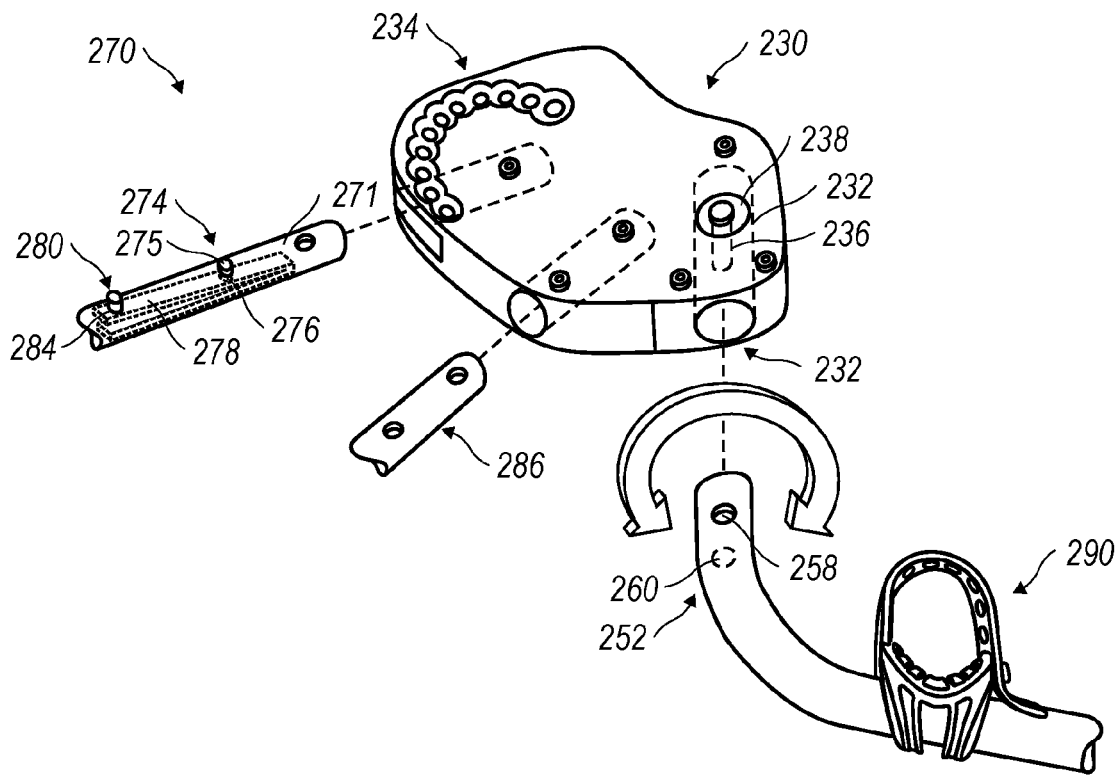
FIG. 16 is an exploded perspective view of the hub depicted in FIG. 15, with additional internal features of the hub, as well as components connectable thereto, shown in broken lines.

FIG. 16, which is an exploded view of this unique hub 230 clearly demonstrates the interaction between the several components that are joined together by the hub 230. For instance, an exemplary design of a leaf spring 278 is shown positioned in the interior space 271 of the first support member 270. Similarly, both the insert pin 274 and the pushpin 280, together with their respective projecting portions and root ends, are shown cooperate together during operation for fixing relative orientations of the carrier 210 through cooperation with the plurality of apertures 234. Still further, an exemplary location and orientation of the substantially cylindrically-shaped socket 232 is shown with the associated locking pin 236 with its graspable head 237 located in the surrounding recess 238. The first 258 and second 260 apertures which are located on opposite sides of the insert portion 252 of the carrying member 250 are also shown as they are provided for co-operation with the locking pin 236. A double-headed arrow is provided indicating the twisting or rotating action of the load carrying member 250 in its receiving socket 232.

Figure 17:
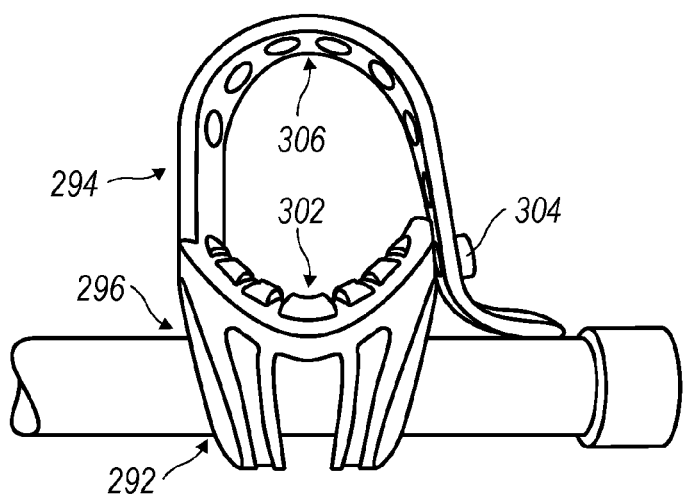
FIG. 17 is an elevational, perspective view of an exemplary embodiment of the cradle employed in the exemplary carrier of FIG. 13.
Figure 18:
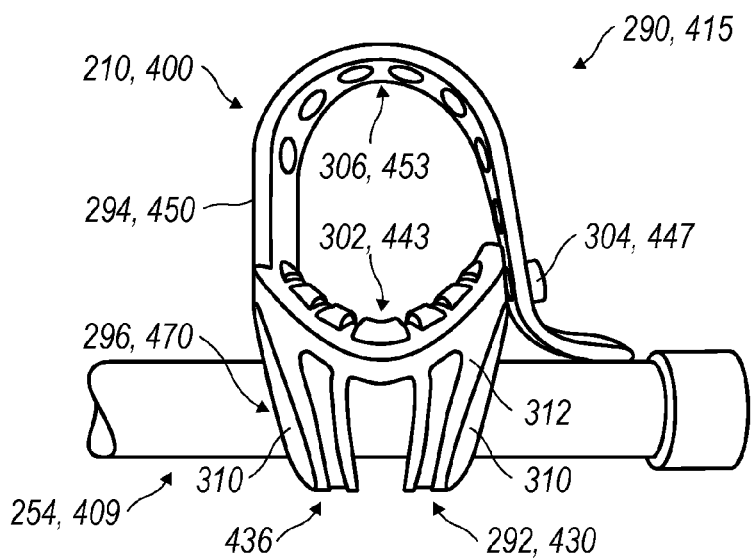
FIG. 18 is an elevational, perspective view of the cradle of FIG. 17 illustrating that cradle's two-piece construction.

A number of alternative embodiments of the cradle are illustrated in the Figures. A unique unibody design of one-piece construction is shown in FIG. 17, while a two-piece construction is shown in FIG. 18. In common between several of the designs is a through-hole 296, 470 a ribbed bicycle-receiving or engaging surface 302, 443 on a base 292, and a retaining strap 294, 450. A fastening tab 304, 447 is provided on the base 292, 430 and a series of apertures or fastening holes 306, 453 are provided in the retaining strap 294, 450. Together, the apertures 306, 453 selectively cooperate with the tab 304, 447 for a custom fit about a frame member of a bicycle carried thereupon.

The alternative embodiment of FIG. 18 depicts a multi-piece cradle 290, 415, exemplarily shown as a two-piece construction. A primary portion of the base 292, 430 is constituted by an elastomeric buffering semi-flexible component 312 at least partially surrounded by a truncated V-shaped fortifying, and substantially rigid component 310. As shown, the elastomeric buffering component 312 is made of one-piece construction together with the retaining strap 294, 450. The two sides of the fortifying and substantially rigid cradle components 310 are oriented at an angle with respect to vertical, which also institutes an angle between these fortifying components 310 and a long axis of the cradle 290. Because of this orientation, pulling forces exerted by the retaining strap 294, 450 on a half 436 of the more rigid component causes a lower end, which is toed inward, to be biased outward. This biasing of the lower end of one side of the more rigid component causes a binding effect between that component, and in turn the cradle 290, 415 and the load carrying portion 254 of the carrying member 250, 409 upon which it is located. This is a substantial benefit in that the pulling action on the retaining strap 294, 450 is usually caused by the load, such as a carried bicycle, B, tending to be dislocated therefrom. Without this binding effect, the cradle 290, 415 is more apt to slide upon the carrying member 250, 409. Still further, the greater the pull on the one side of the rigid component, the greater the binding effect and the better the cradle 290, 415 serves as an anchor for the secured article, such as a bicycle, B, to the load carrier arrangement 210, 400.

Figure 20:
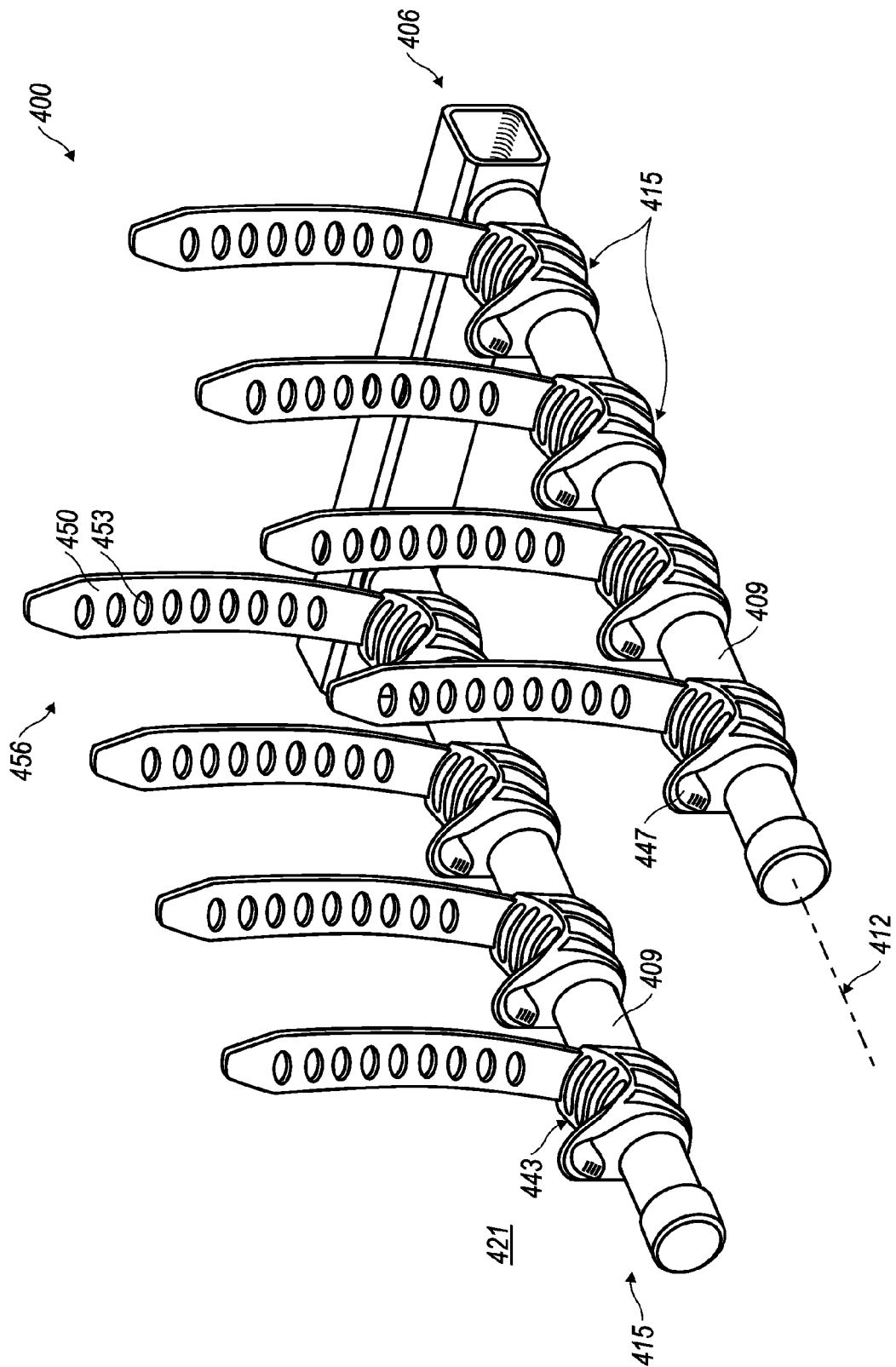
FIG. 20 is a perspective view of a load carrier arrangement demonstrating several cradles configured according to one embodiment of the present invention(s)

FIG. 20 represents a load carrier arrangement 400 having a frame assembly 406 that includes two elongate arms 409. As will be appreciated by those persons skilled in the art, the arrangement illustrated in FIG. 20 represents but a portion of a total rack assembly configured to be mounted on a carrying vehicle. Exemplary rack systems into which the arrangement of FIG. 20 can be incorporated are typified in at least FIGS. 1 and 13 of the present disclosure. In this regard, the arrangement 400 of FIG. 20 should be appreciated as being particularly suited to rear amount sport rack configurations, and particularly those that are mounted as disclosed in FIGS. 1 and 13, as well as configurations commonly referred to as hitch-mount racks. In FIG. 20, a longitudinal axis 412 of one of the arms 409 has been shown for reference purposes herein.

A collection of eight bicycle cradles 415 are shown in FIG. 20, and which are configured according to the teachings of the present invention and are consonant with that which has been described with respect to FIG. 18. The cradles 415 of FIG. 20, however, also have additional unique features which will be discussed in greater detail hereinbelow. As with the previously described cradle embodiments, the cradles 415 are composed of a plurality 424 of individual cradle pieces 427 generally comprise a base 430 configured to receive a load (bicycle, B) thereon, and which is connected with a retaining strap 450 for securing and maintaining the load in place on the base 430 once installed thereupon, and until intentionally removed. As may be best appreciated from FIG. 1, the "load" exemplified in the present specification takes the form of a bicycle, B, having a frame member, F, that includes a portion, C, which is directly securable in a cradle 415. As before, the retaining strap 450 includes a series of fastening holes 453 that cooperate with a fastening tab 447 exemplarily extending from the base 430 to form a custom fit securement mechanism 456 for the bicycle, B.

Figure 22:
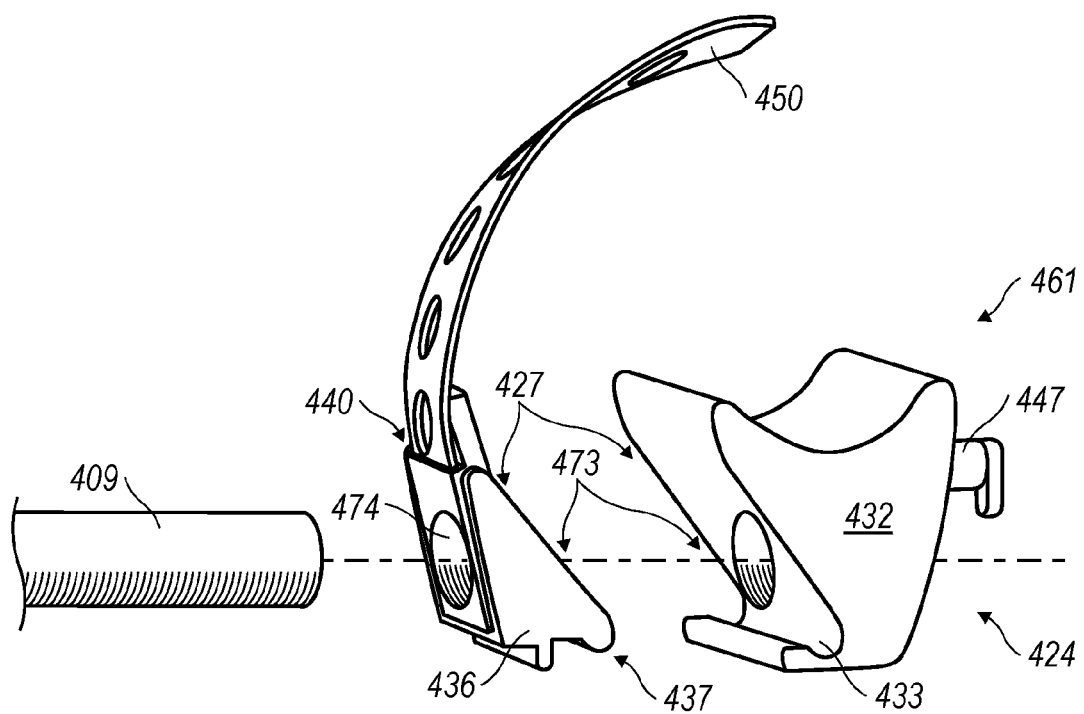
FIG. 22 is an exploded perspective view of the bicycle cradle readied for installation on a supporting elongate arm.

FIG. 22 illustrates one embodiments of a bicycle cradle 415 configured according to the present teachings. The base 430 is depicted as having a first portion 432 that operatively interacts with a second portion 436 for establishing and transitioning between a non-transporting configuration 421 (see FIG. 23) and a bicycle transporting configuration 418 (see FIG. 24).

Figure 21:
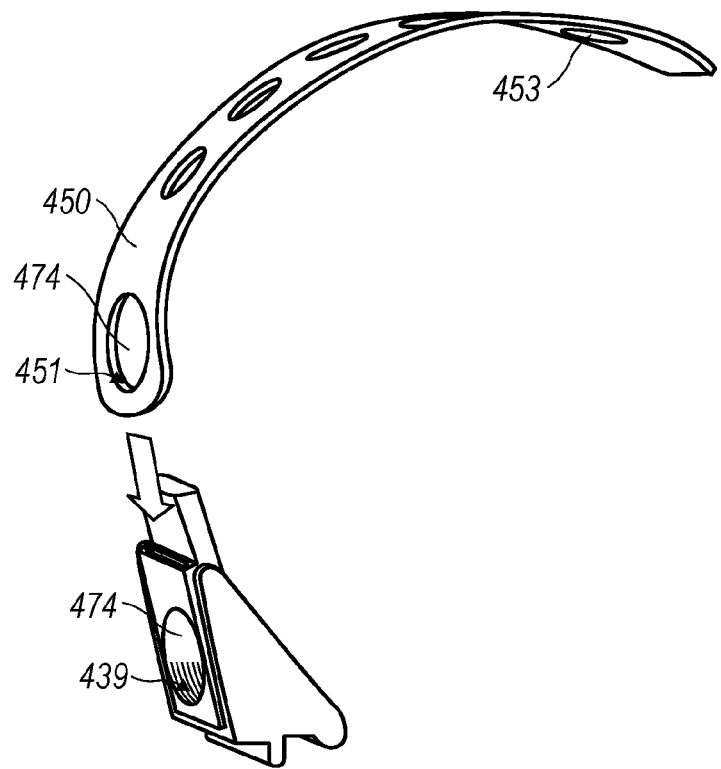
FIG. 21 is a perspective view of a retaining strap being installed in an actuable portion of a base of one embodiment on an exemplary bicycle cradle.

FIG. 21 demonstrates an exemplary assemblage procedure between a retaining strap 450 and the actuable second portion 432 of the base 430. In this embodiment, the second portion 436 of the base 430 includes a strap receiving portion 438 established as a strap receiving channel 440 that insertibly receives a lower portion of the retaining strap 450. From FIG. 21, it may be readily appreciated that the retaining strap 450 includes an aperture 474 therein that in the configuration of FIG. 22 has been brought into alignment with an aperture 474 of the second portion 436. As may be appreciated in FIGS. 22-23, each of the first and second portions 432, 436 and the retaining strap 450 each have apertures 474 that in an assembled configuration together form a series of apertures 473 that, as illustrated in FIG. 22, can be sufficiently aligned to form a through-passage 470 that permits insertion therein of an elongate arm 409.

Figure 25:
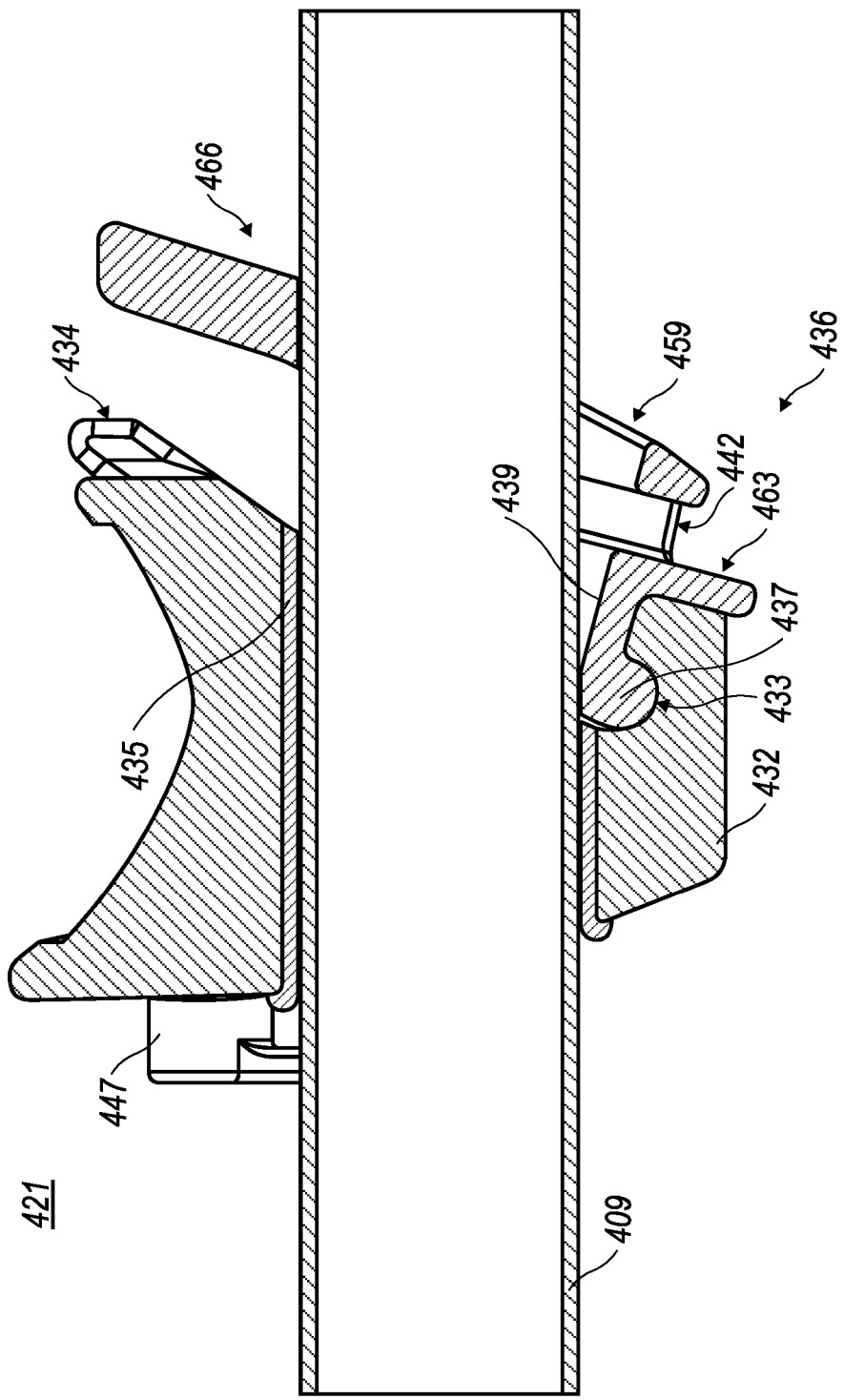
FIG. 25 is a cross-sectional view of a cradle of the type shown in FIG. 22 in a non-transporting configuration.
Figure 26:
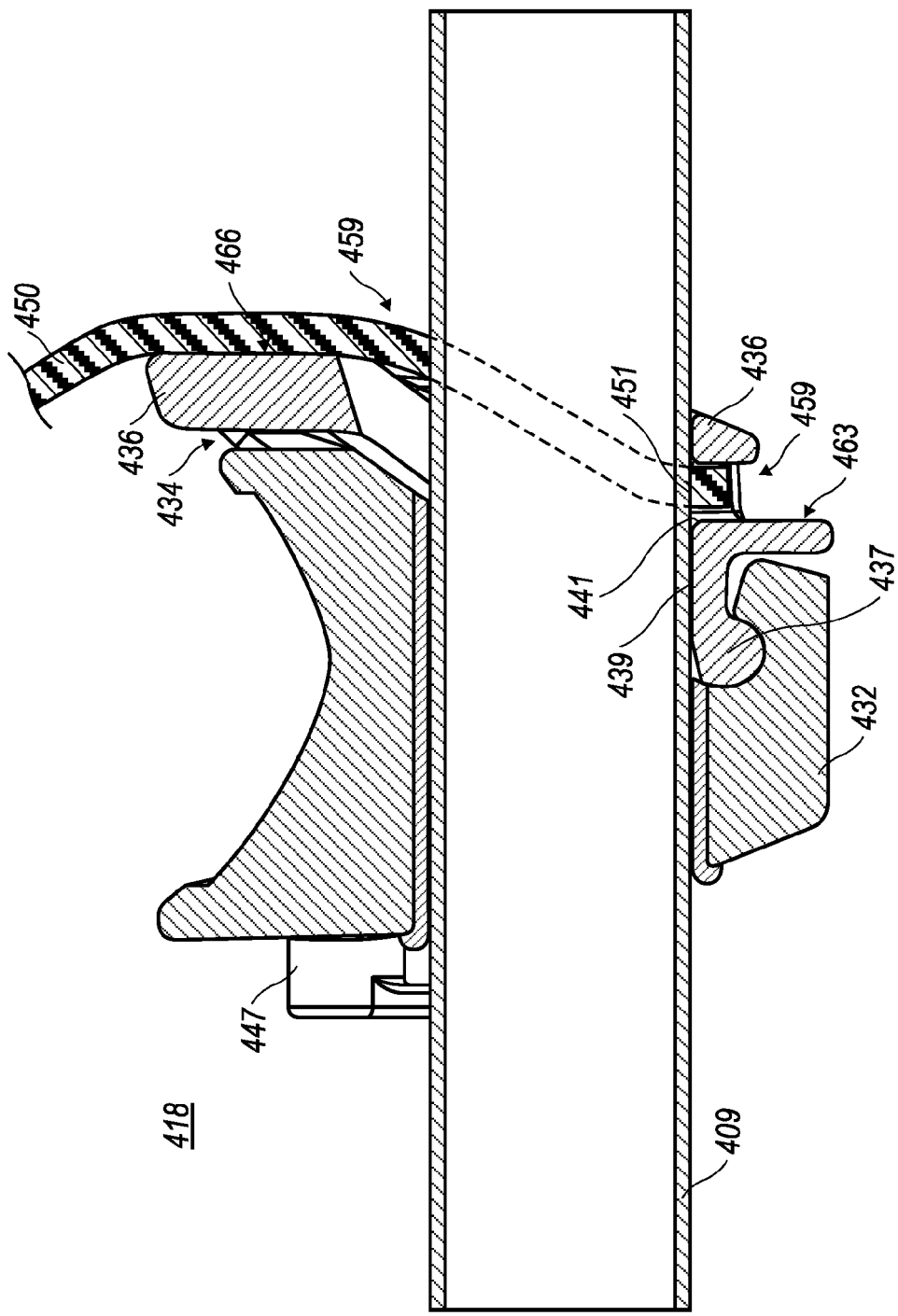
FIG. 26 is a cross-sectional view of a similar cradle to that of FIG. 22 in a bicycle transporting configuration.

The non-transporting configuration 421 and the bicycle transporting configuration 418 are respectively cross-sectionally illustrated in FIGS. 25 and 26; views which further aid in an understanding of the operable features of this embodiment. As depicted, the second portion 436 is capable of pivotal operation relative to the first portion 432. This operation is facilitated by the trapped insertion of a bull-nose portion 437 of the second portion 436 in a receiving or trap recess 433 in the first portion 432 in the arm-installed configuration. As illustrated in FIG. 25, the portion of the through-passage 470 formed by the first portion 432 establishes a substantially conformance fit about the arm 409 that is tight enough to lend stability to the base 430 with respect to the arm 409, but sufficiently loose to permit easy, non-binding, operator hand reciprocation of the base 430 along suitable lengths of the arm 409 into a desired transport position. In the illustrated embodiment, the snugness of fit of the first-base portion 432 is accomplished by the inclusion of a resilient liner 435 in the aperture 474 of that part which fills the moderate clearance space between that portion 432 and an inserted arm 409.

In the non-transporting configuration 421 of the cradle 415 (FIG. 25), the aperture 474 of the second portion 436 through which the arm 409 is inserted also imposes little or no friction therebetween. There may be a snugness of fit as described with respect to the first portion 432, or the fit may be looser. In either case, the fit of the second portion 436 upon the arm 409 in the non-transporting, or relaxed configuration 421, presents only a minimal friction factor that is easily operator overcome for hand-adjustment of the position of the cradle 415 on the arm 409 as described above.

The aperture 474 of the retaining strap 450 also loosely fits about the arm 409 in the non-transporting configuration 421 to an extent that it likewise offers little resistance to operator reciprocation of the relaxed cradle 415 along lengthwise portions of the arm 409 before the bicycle transporting configuration 418 of FIG. 26 is instituted. As described above regarding the purpose of the resilient liner 435, it is preferable that even in the non-transporting configuration 421, there be a sufficient tightness of the base 430 about the arm 409 to prevent free movement of the cradle 415 on the carrier 400 under the influence of its own weight during otherwise normal vehicle travel.

Figure 23:
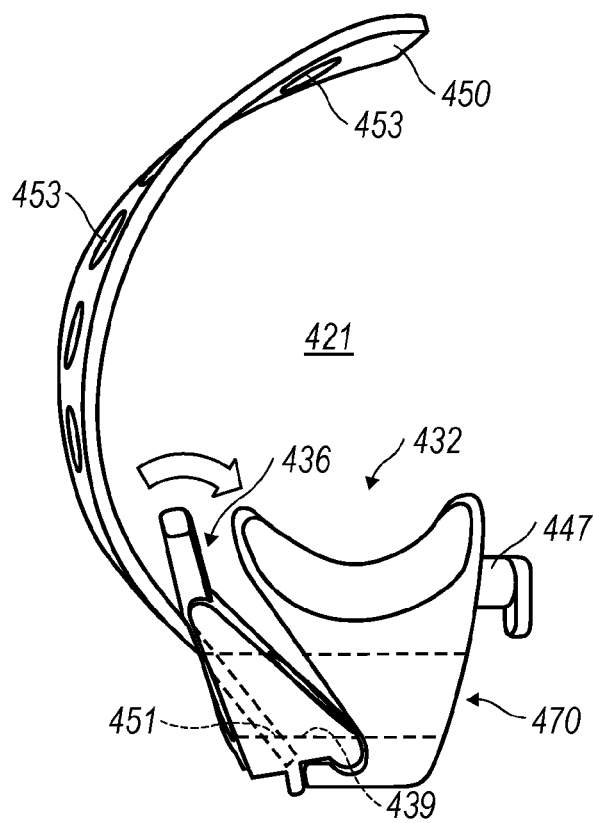
FIG. 23 is an assembled perspective view of the cradle of FIG. 22 in a non-transporting configuration.
Figure 24:
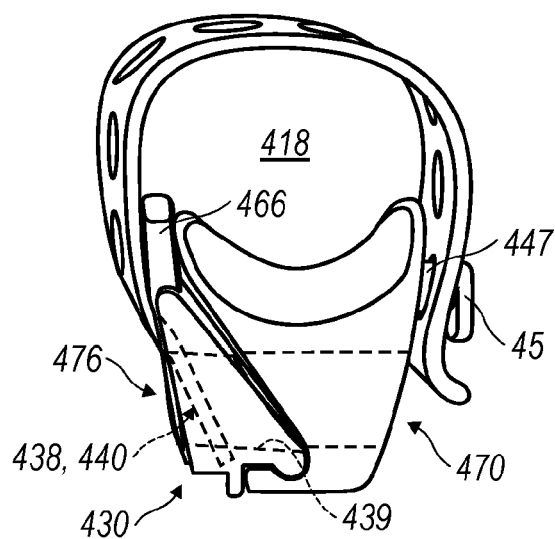
FIG. 24 is an assembled perspective view of the cradle of FIG. 22 in a bicycle transporting configuration.

Exemplary operation of the cradle 415 may be best appreciated observing the transition from the non-transporting configuration 421 of FIG. 23 to the bicycle transporting configuration 418 of FIG. 24; the same transition being cross-sectionally illustrated between FIGS. 25 and 26. In the non-transporting configuration 421 (FIGS. 23 and 25) the cradle 415 fits snugly on the arm 409, but with a capability for being manually reciprocated upon the arm for custom positioning. A load, such as a bicycle, B, is thereafter installed upon the cradle's 415 base 430. Exemplary, the portion, C, of the bicycle's frame, F, rests on a receiving surface 443 of the base 430 for anchored securement therein. To accomplish such anchoring, the elastomeric retaining strap 450 is pulled taut about the bicycle frame and secured at the opposite side of the cradle 415 at the first portion 432. As may be appreciated from FIG. 24, the retaining strap 450 includes a series of fastening holes 453 that cooperate with the fastening tab 447 by being hooked thereupon to provide a custom fit securement mechanism 456.

As may be best appreciated from FIG. 26, the pulling tightness of the retaining strap 450 presses upon the second portion 436 of the base 430 causing that portion to transition from the non-transporting configuration 421 to the bicycle transporting configuration 418. As a result, the second portion 436 of the cradle 415 pivots on the bullnose 437 in the trap recess 433 of the first portion 432. To accommodate such pivotation, or partial rotation, the mating surfaces of a nose 437 and recess 433 are substantially rounded for a conformance fit therebetween. Adjacent the bullnose 437 resides pressing surface 439. As the second portion 436 is urged into the bicycle transporting configuration 418, the pressing surface 439 is effectively raised or constricted against the elongate arm 409. Because the arm 409 is confined by a top portion of the first portion 432 of the base 430 at the opposite side of the arm 409 from the pressing surface 439, the movement of the second portion 436 into the bicycle transporting configuration 418 causes an affective constriction of the cradle 415 about the arm. As seen in FIGS. 25 and 26, the second portion 436 of the cradle 415 pivots into engagement with a flexible stop 434 which acts as a buffer between the portions 432, 436.

In this manner, a tight fit of the cradle 415 is instituted upon the arm 409. In this regard, and is best appreciated from FIG. 26, the second portion 436 either singularly, or in combination with cooperating portions of the cradle 415, can be considered a binding assembly 459 because, regarding cradle reciprocation upon the arm 409, a binding effect exists in the bicycle transporting configuration 418 which prevents such relative movement. The binding assembly 459 is constituted by the several variably configurable cradle portions 461 (exemplarily the first and second portions 432, 436 of the base 430), and includes a binding portion 463 (exemplarily the pressing surface 439) and a lever portion 466. Utilizing such a lever system, the binding assembly 459 embodies a capability for exerting a greater pressing or binding force against the arm 409 at the binding portion 463 than the actuating force that is applied upon the lever portion 466. As may be appreciated from the illustration of FIG. 26, the binding effect is frictionally based, and therefore not an absolute connection. The tightness of fit is, however, sufficient to prevent easy manual movement of the cradle 415 on the arm 409, or movement of a loaded cradle being acted upon by the shifting weight of, for instance, an installed bicycle during normal types of transporting vehicular travel.

As illustrated, the pressing surface 439 is actually formed as a lower portion of the aperture 474 in the second portion 436 of the base 430. As demonstrated in at least FIGS. 22 and 25, in the non-transporting configuration 421, this aperture 474 in the second portion 436 is substantially aligned with the other apertures 474 constituting the series of aperture's 473 through which the elongate arm 409 is inserted. By the movement demonstrated in FIG. 23 from the non-transporting configuration 421 to the bicycle transporting configuration 418, pivotation of the second portion 436 takes the aperture 474 of the second portion 436 out of alignment with the other apertures 473, and thereby constitutes a misaligned aperture 476. It is by this misalignment that the binding assembly 459 acts in this illustrated embodiment of the invention.

It should be appreciated that the second portion 436 of FIG. 25 is configured slightly differently from that of FIG. 26 with respect to retaining strap reception. In FIG. 25, the second portion 436 is adapted with a strap seat 442 that can be configured to minimize, manage or prevent the retaining strap 450 from having contact with the arm 409 in the bicycle transporting configuration 418 and thereby regulating induced friction-drag of the cradle 415 on the arm 409. A special benefit, however, has been observed utilizing the configuration of FIG. 26 in which the retaining strap 450 is allowed direct contact with the arm 409. When the retaining strap 450 is constructed from an elastomeric material such as rubber, a heightened degree of friction is experienced at a binding surface 451 thereof when the strap 450 is pulled taut against the arm 409, as compared to the friction experienced by the higher durometer (harder) plastic base portion 436. It has been observed that this heightened degree of friction experienced at the strap 450 will cause the strap 450, in the lower region of the base 430, to bear against adjacent side surfaces of the second portion 436 during attempted movements of the cradle 415 on the elongate arm 409 when in the bicycle transporting configuration 418 (FIG. 26).

It has further been discovered that in these instances of pressing engagement between the elastomeric retaining strap 450 and the harder plastic second portion 436, an enhanced binding effect is experienced because the softer retaining strap 450, having a lower elastic modulus than the plastic second portion 436, tends to elastically extrude or deform into the minute gap space(s) between the aperture 474 of the base portion 436 and the arm 409 at that portion's 436 interface with the strap 450. In appreciation of this phenomenon, and a desire to potentiate the binding effect achieved thereby, chamfers 441 can optionally be provided in these areas by beveling the perimeter(s) of the aperture(s) 474 in the base portion 436 adjacently facing the retaining strap 450. In this manner, a small circumferential, or at least partially circumferential gap space is provided for receiving elastically deformed portions of the strap 450 when forces are applied to the cradle 415 that could otherwise cause unintended displacement upon the arm 409.

Figure 33:
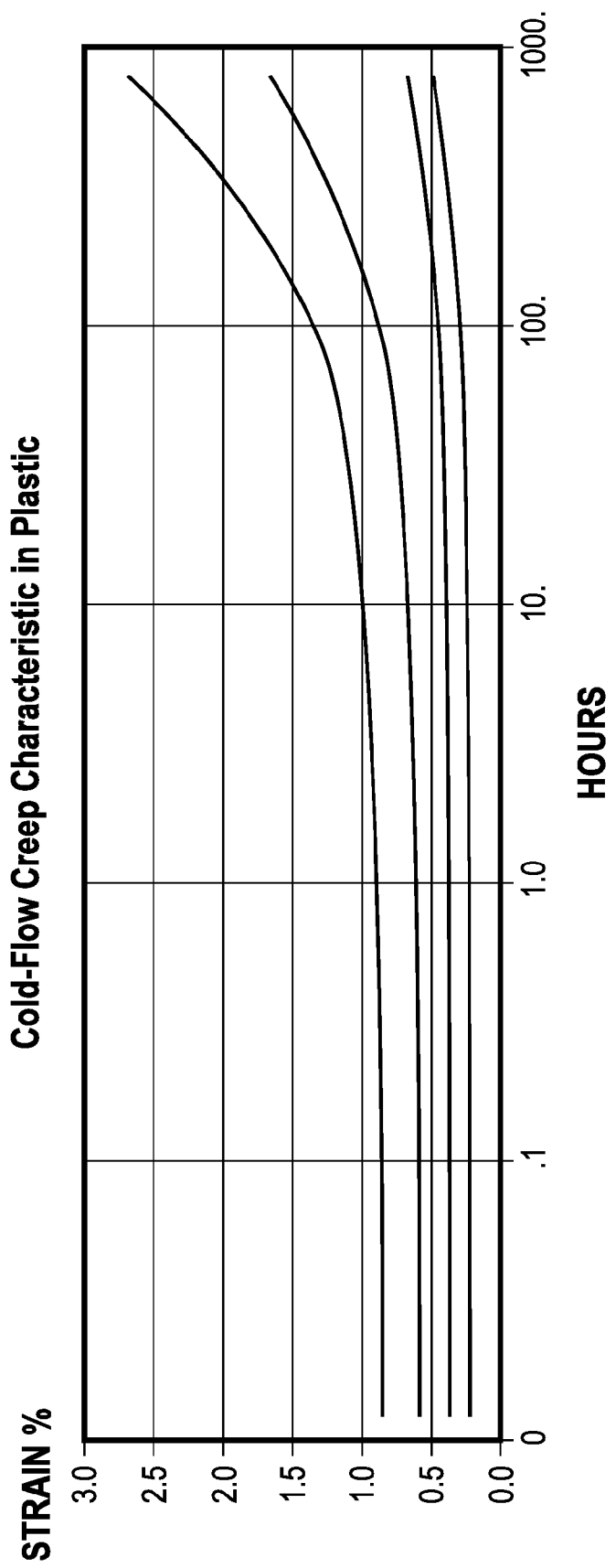
FIG. 33 is a text book-style illustration of cold-flow creep characteristics of plastics.
Figure 34:
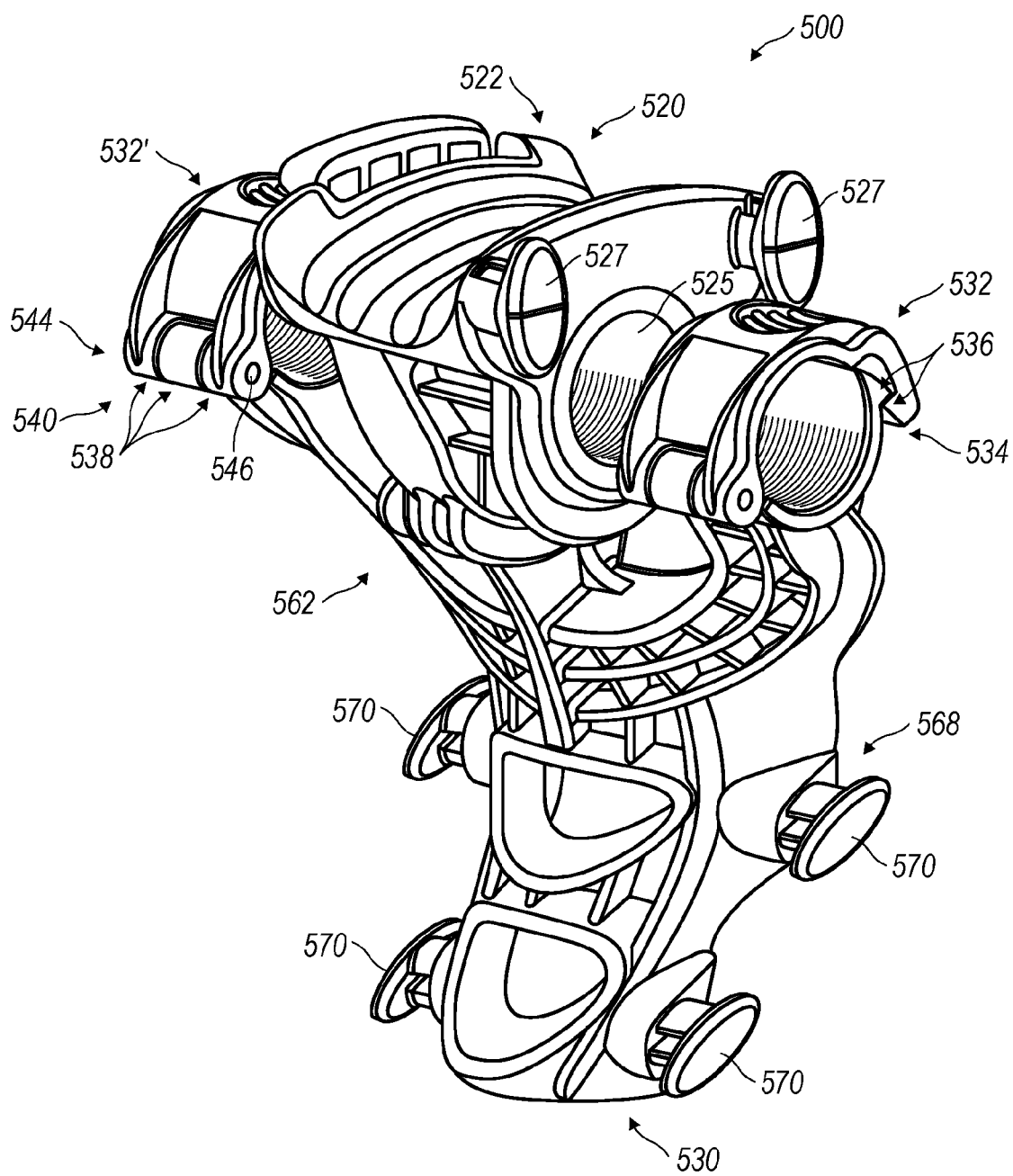
FIGS. 34-41 variously depict anti-sway devices that are utilizable in conjunction with a bicycle cradle for stabilizing a cargo load on a load carrier.
Figure 35:
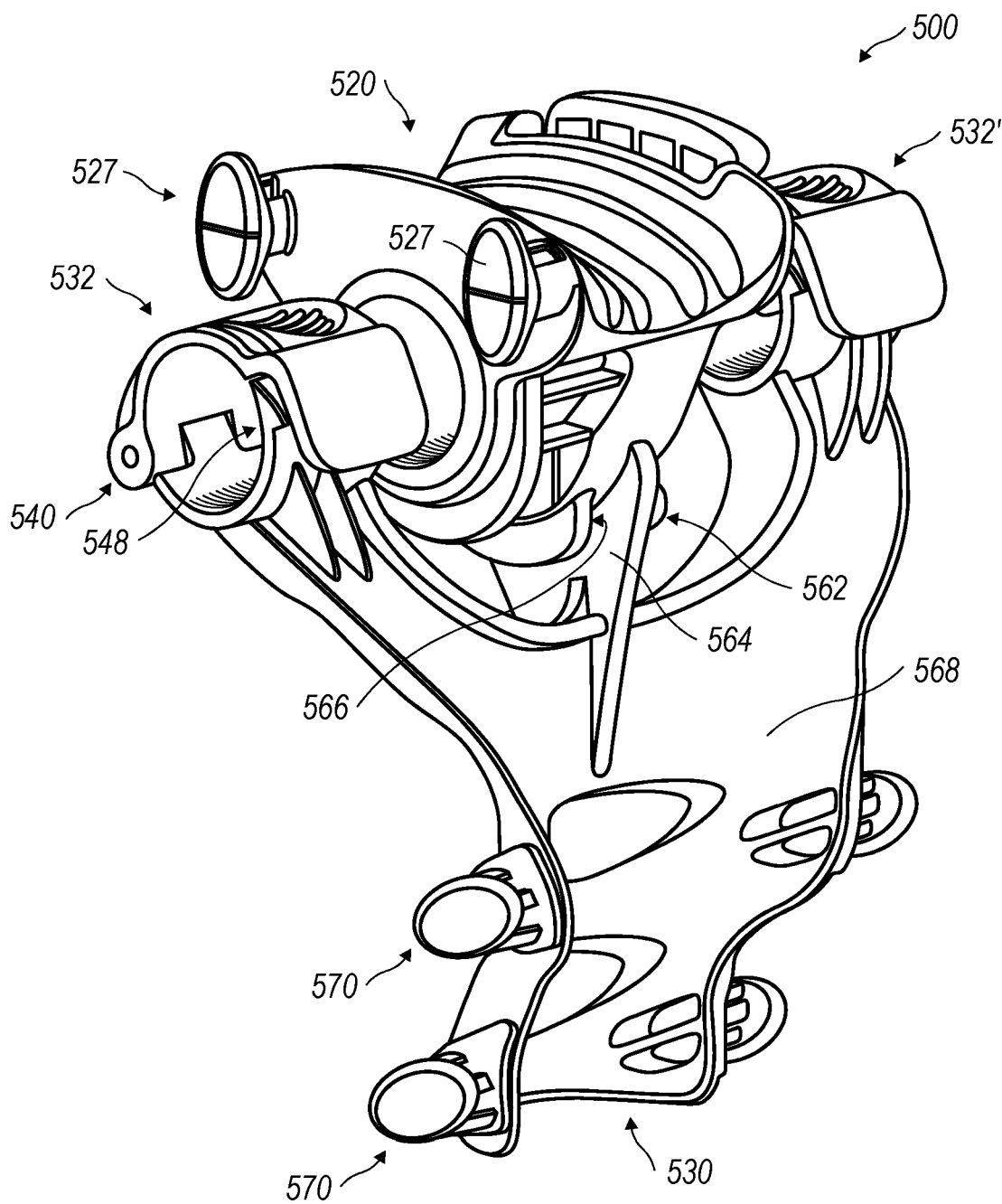
Figure 36:
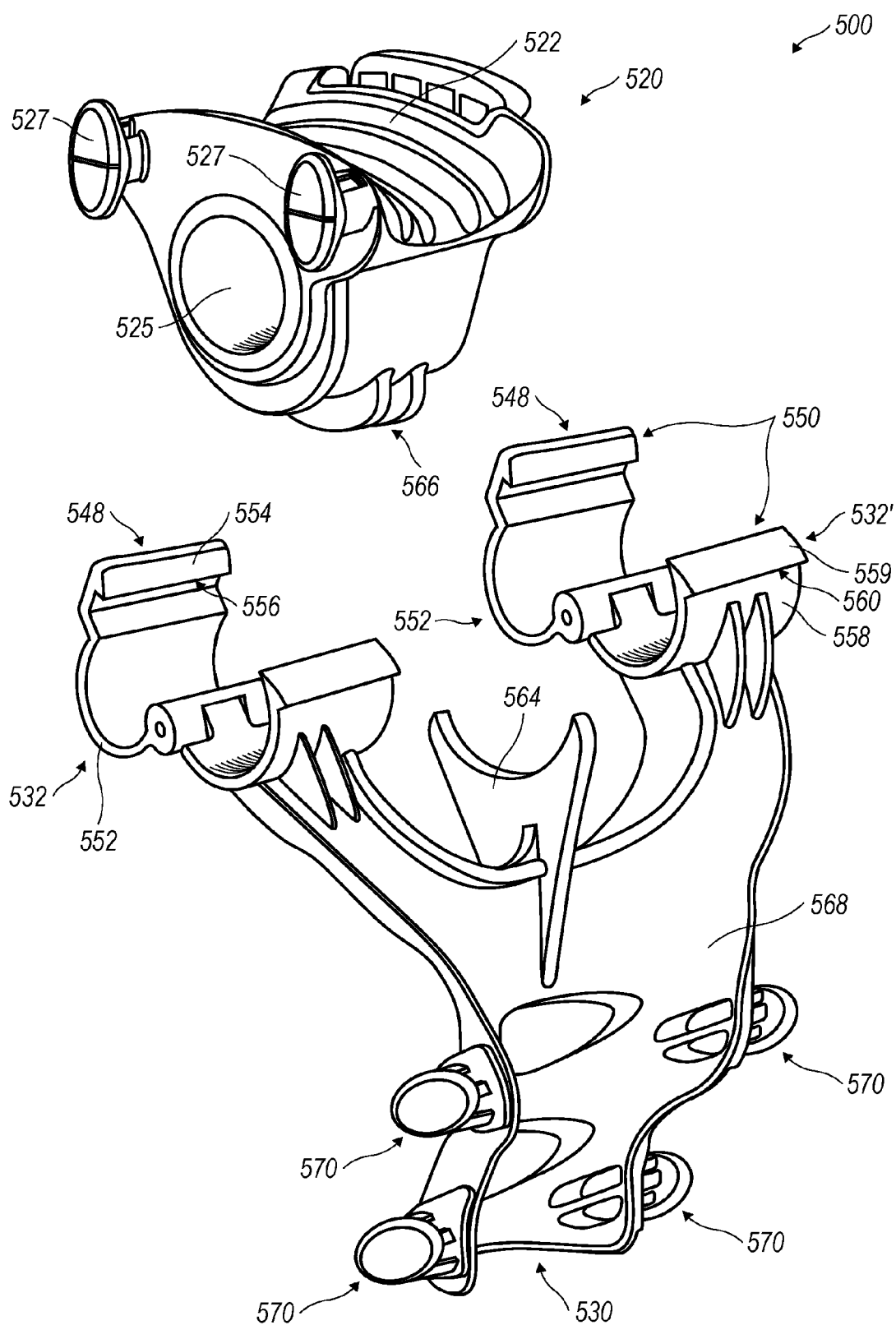
Figure 37:
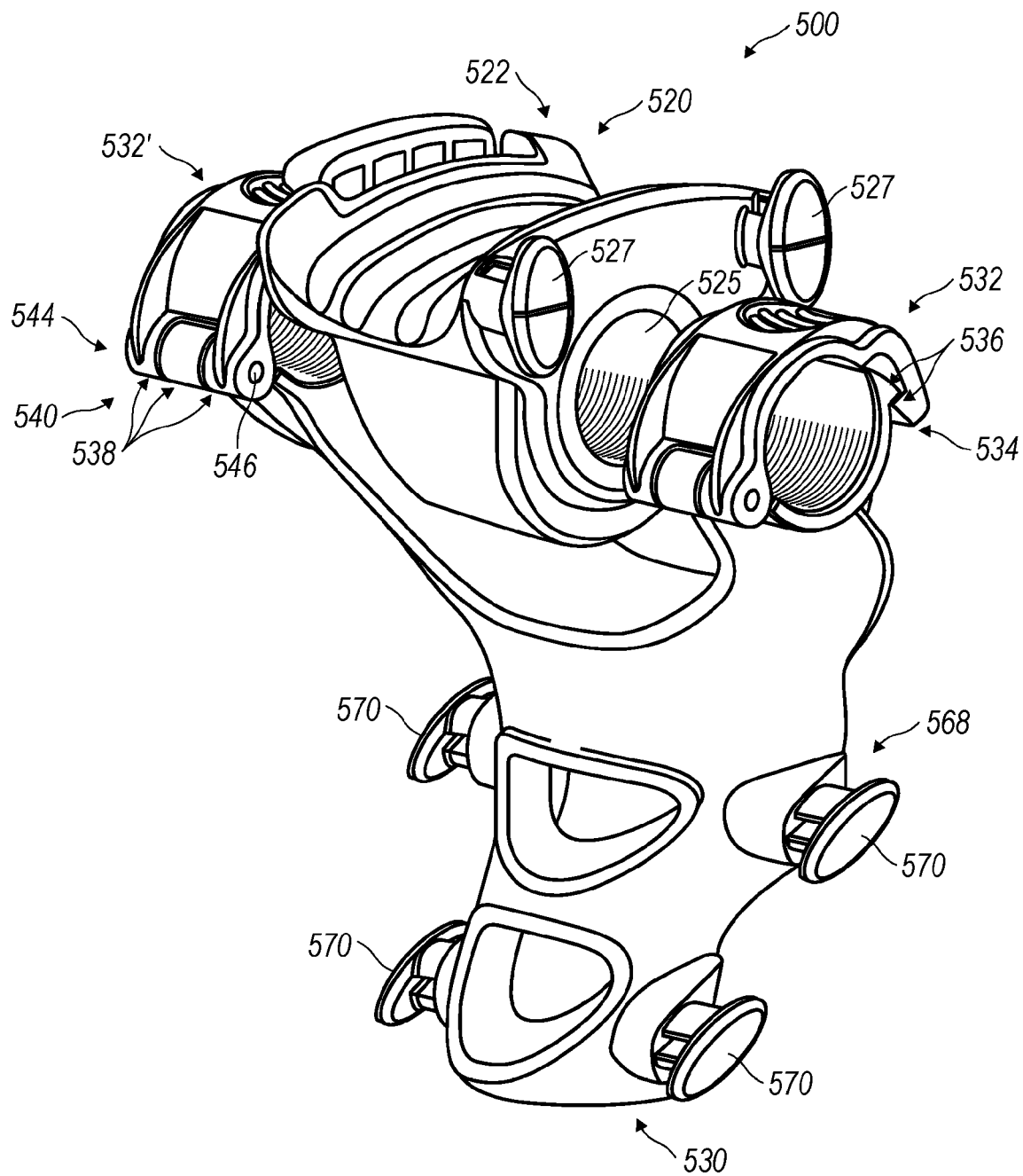
Figure 38:
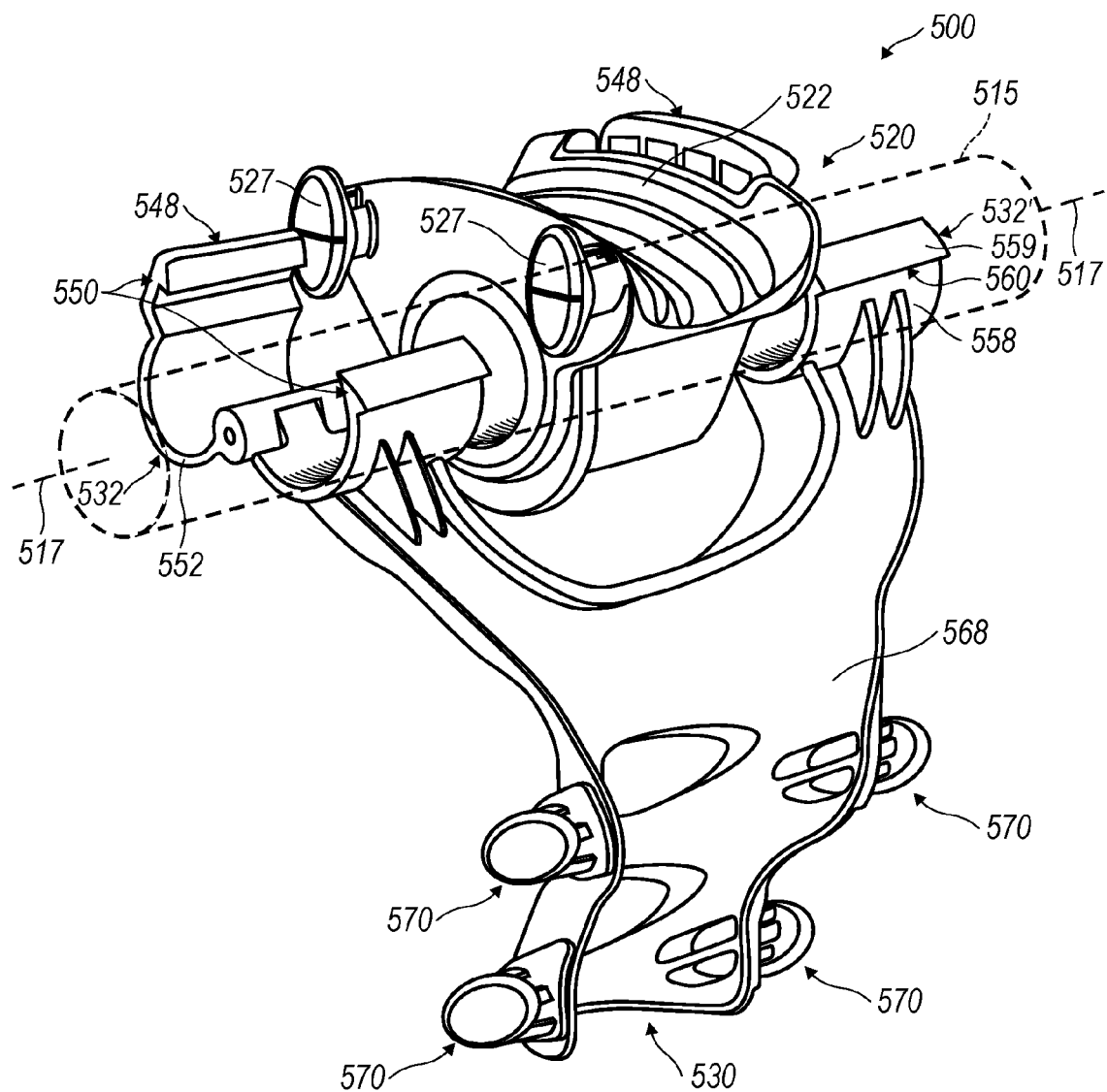
Figure 39:
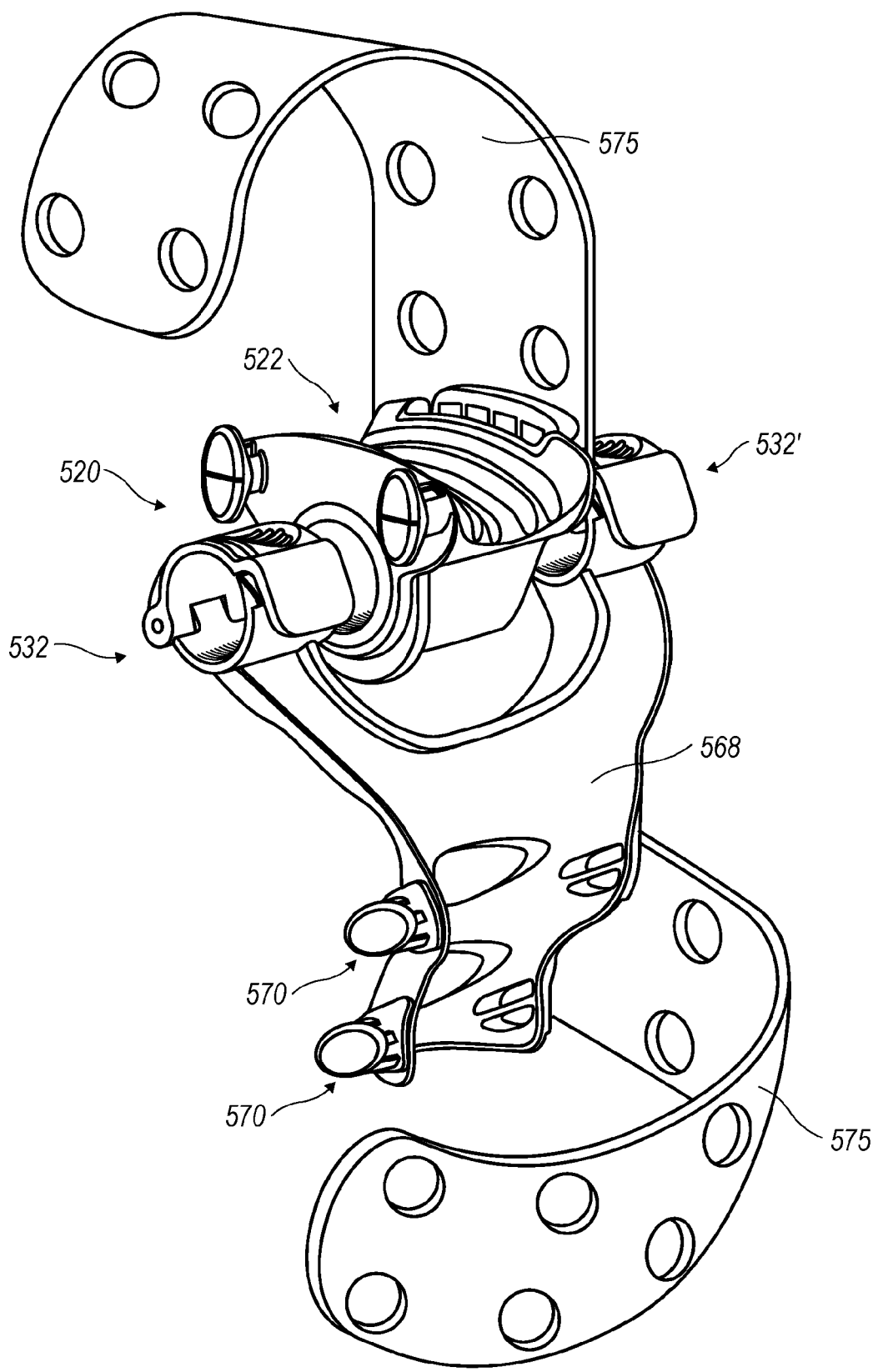

The arrangement, configuration and operation of the cradle 415 described hereinabove contribute to the benefits enjoyed through utilization of the presently described invention. As alluded to above, load bearing cradles of the instant type are often constructed from high durometer plastic that is subject to cold-flow creep (a text-book type illustration of which is provided in FIG. 33). As discussed in the background, if a cradle of such construction is installed upon an arm with a continuing reliance on the initial tightness established by the fit of the cradle on the arm, negative results are frequently experienced because all of the cold-flow creep of the plastic, overtime, moves the plastic toward the expanded configuration that is being urged by the arm's outward pressure on the surrounding cradle. When such creep does occur, it normally results in a detrimental loosening of the cradle's tightness of fit about the arm, and a corresponding reduction in the cradle's capability for anchoring the desired load (bicycle) with respect to the balance of the carrier. Through utilization of the novel construction and/or operation of the present invention, such cold-flow creep, and the associated loosening of a cradle's fit about the carrying arm is minimized, if not prevented.

According to the teachings of the present invention, the cradle 415 is tightened on the arm 409 into the bicycle transporting configuration 418 (when cold-flow creep will occur) when the cradle 415 is readied for, and experiencing a bicycle, B, installed thereupon. Otherwise, the cradle 415 can be reconfigured into the relaxed, non-transporting configuration 421 in which the fit of the cradle 415 upon the arm 409 is sufficiently loosened to avoid the instigation of cold-flow creep in the plastic constituting at least a portion of the construction of the cradle 415.

Figure 27:
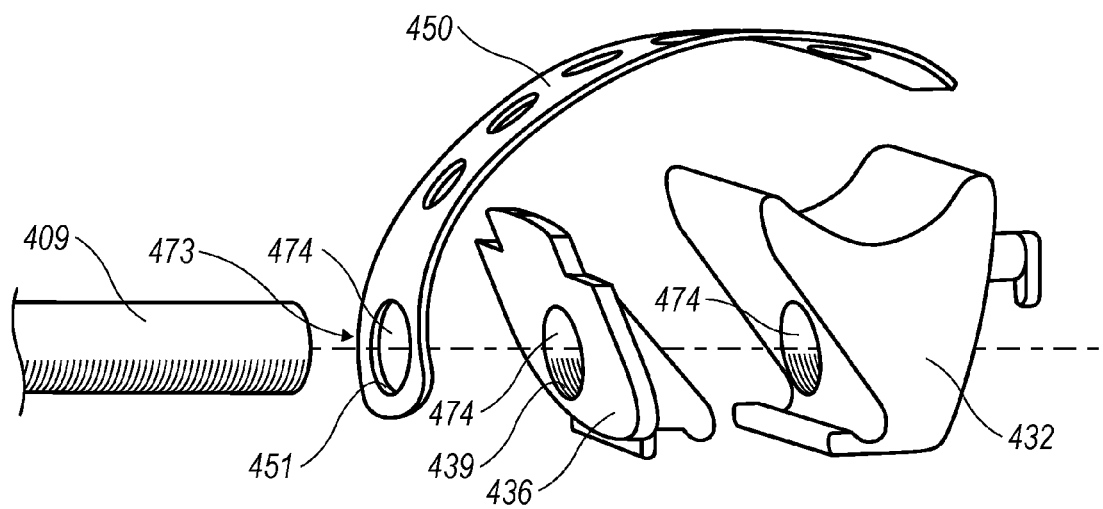
FIG. 27 is an exploded perspective view of an alternative embodiment of a bicycle cradle readied for installation on a supporting elongate arm.
Figure 28:
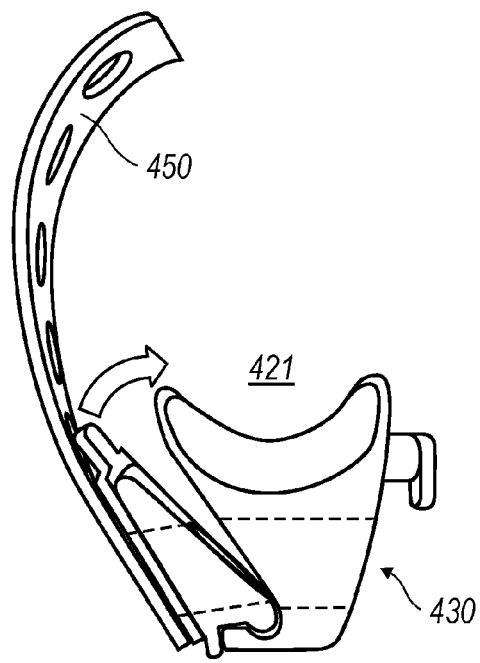
FIG. 28 is an assembled perspective view of the cradle of FIG. 27 in a non-transporting configuration.
Figure 29:
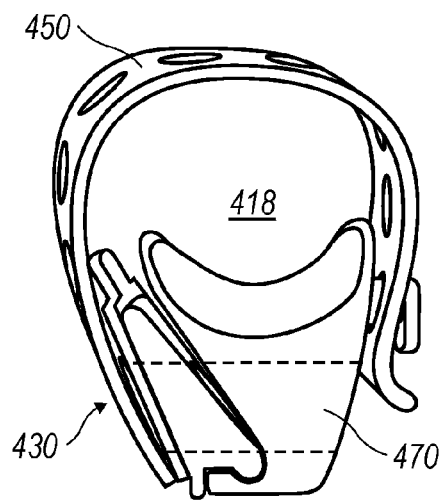
FIG. 29 is an assembled perspective view of the cradle of FIG. 27 in a bicycle transporting configuration.

An alternative embodiment of the cradle arrangement 415 is illustrated in FIGS. 27-29 in configurations substantially paralleling those of FIGS. 22-24. In this embodiment, however, no strap receiving channel 440 is provided; instead, the retaining strap 450 is installed exteriorly to the actuating portion 436 of the base assembly 430 and presses upon an exterior surface thereof for affecting actuation of the cradle 415 into the bicycle transporting configuration 418.

Figure 30:
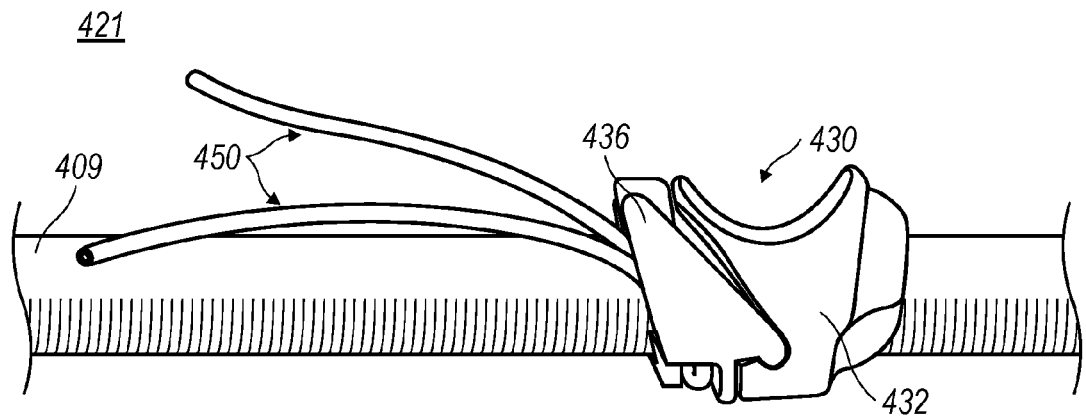
FIG. 30 is an assembled perspective view of still a further alternative embodiment of a cradle in a non-transporting configuration.
Figure 31:
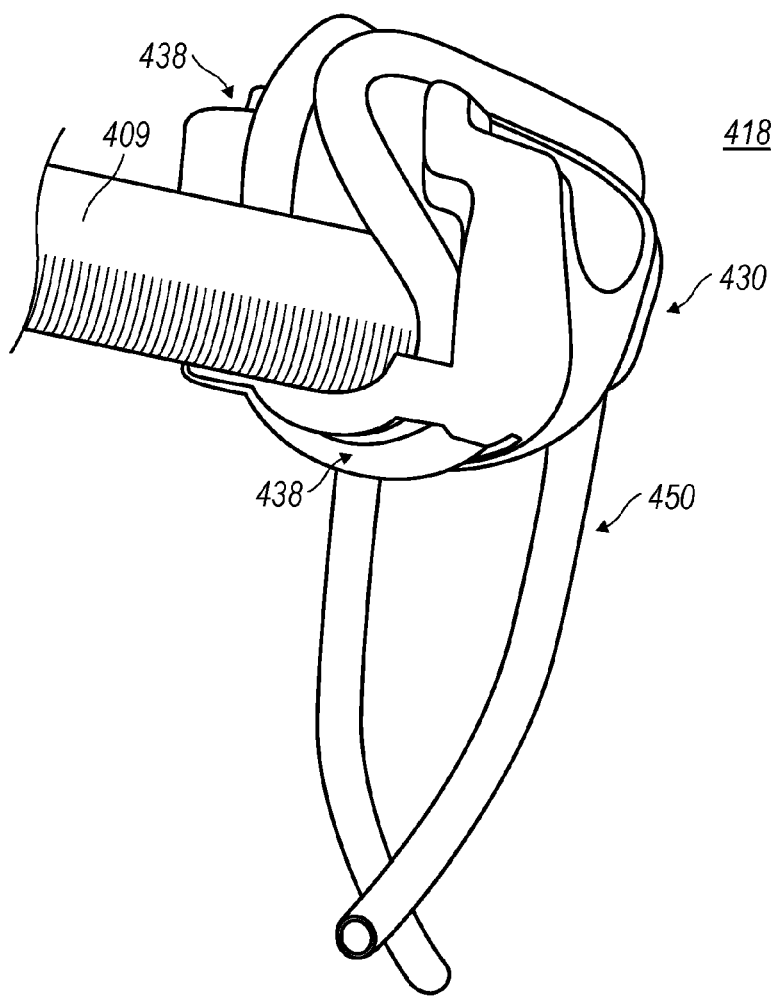
FIG. 31 is an assembled perspective view of the cradle of FIG. 30 in a bicycle transporting configuration illustrating the reception area in the actuable base portion of the cradle for a cord-shaped retaining strap.
Figure 32:
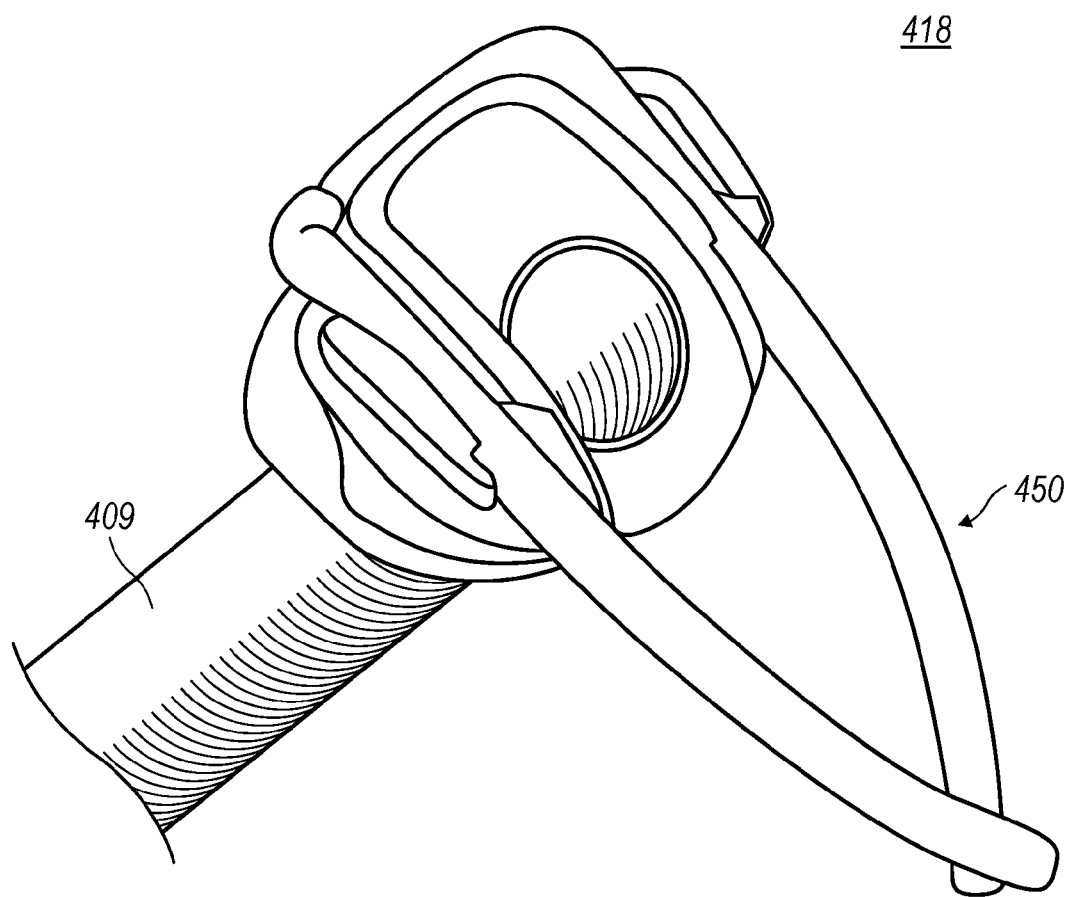
FIG. 32 is an assembled perspective view of the cradle of FIG. 30 in a bicycle transporting configuration illustrating a securement arrangement for a drawn-tight, cord-shaped retaining strap.

A still further embodiment is illustrated in FIGS. 30-32 wherein the retaining strap 450 takes the form of elastomeric tubing or cord, preferably of round cross-sectional shape. A trap space or strap receiving portion 438 is provided in this embodiment for accepting the cord-like strap 450. A binding effect has also been discovered to occur in this embodiment under the action of a force tending to displace such a cradle 415 when in the bicycle transporting configuration 418. In this case, however, the round nature of the cord 450 induces a "rolling" action of the cord under such a displacement force. But because the cord 450 is retained in a trap space formed by the actuating portion 436, the attempt at rolling by the cord merely locks its orientation in the trap space thereby also achieving a binding effect which prevents dislocation of the cradle 415 in the bicycle transporting configuration 418 on the arm 409.

Figure 40:
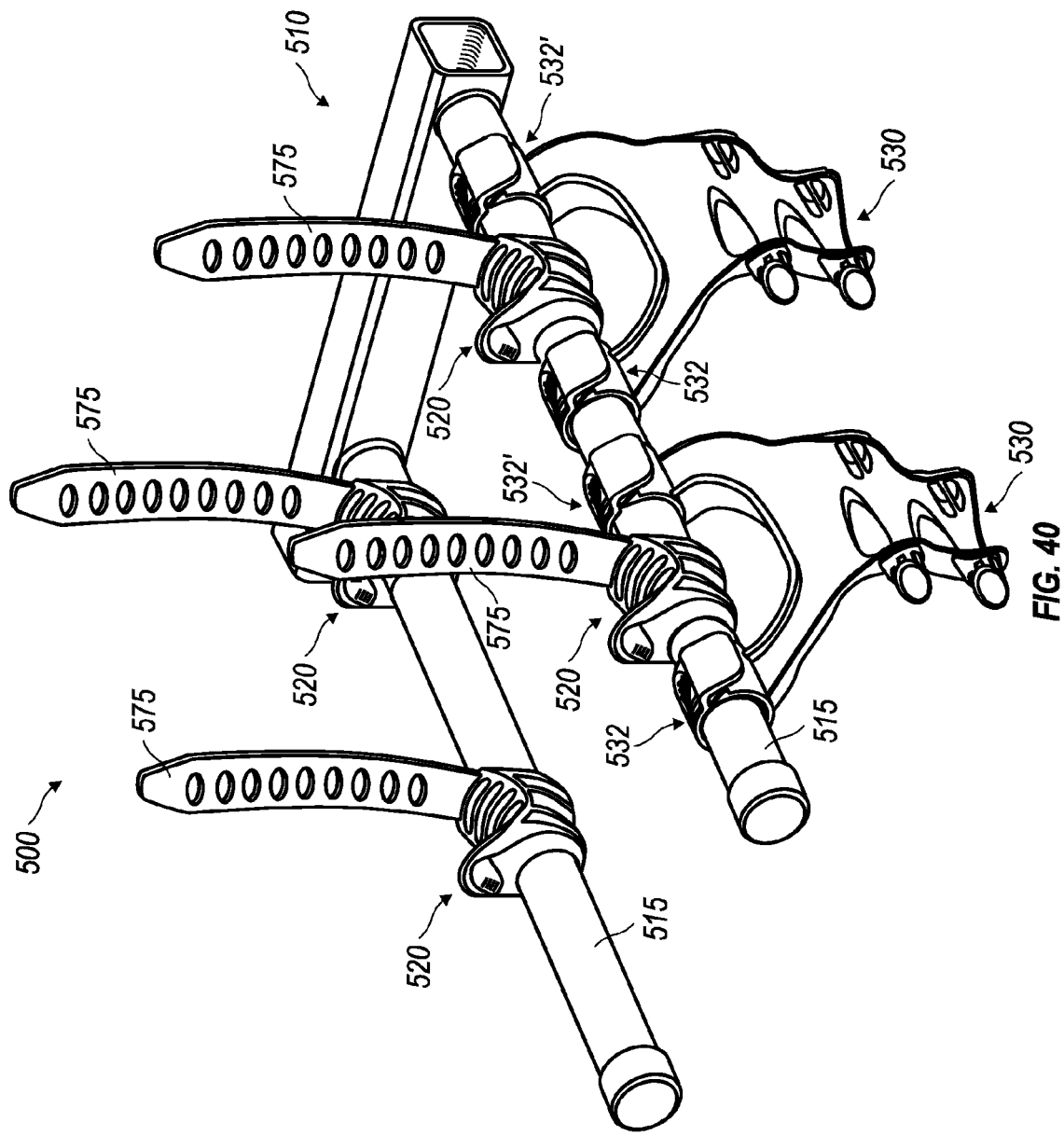
Figure 41:
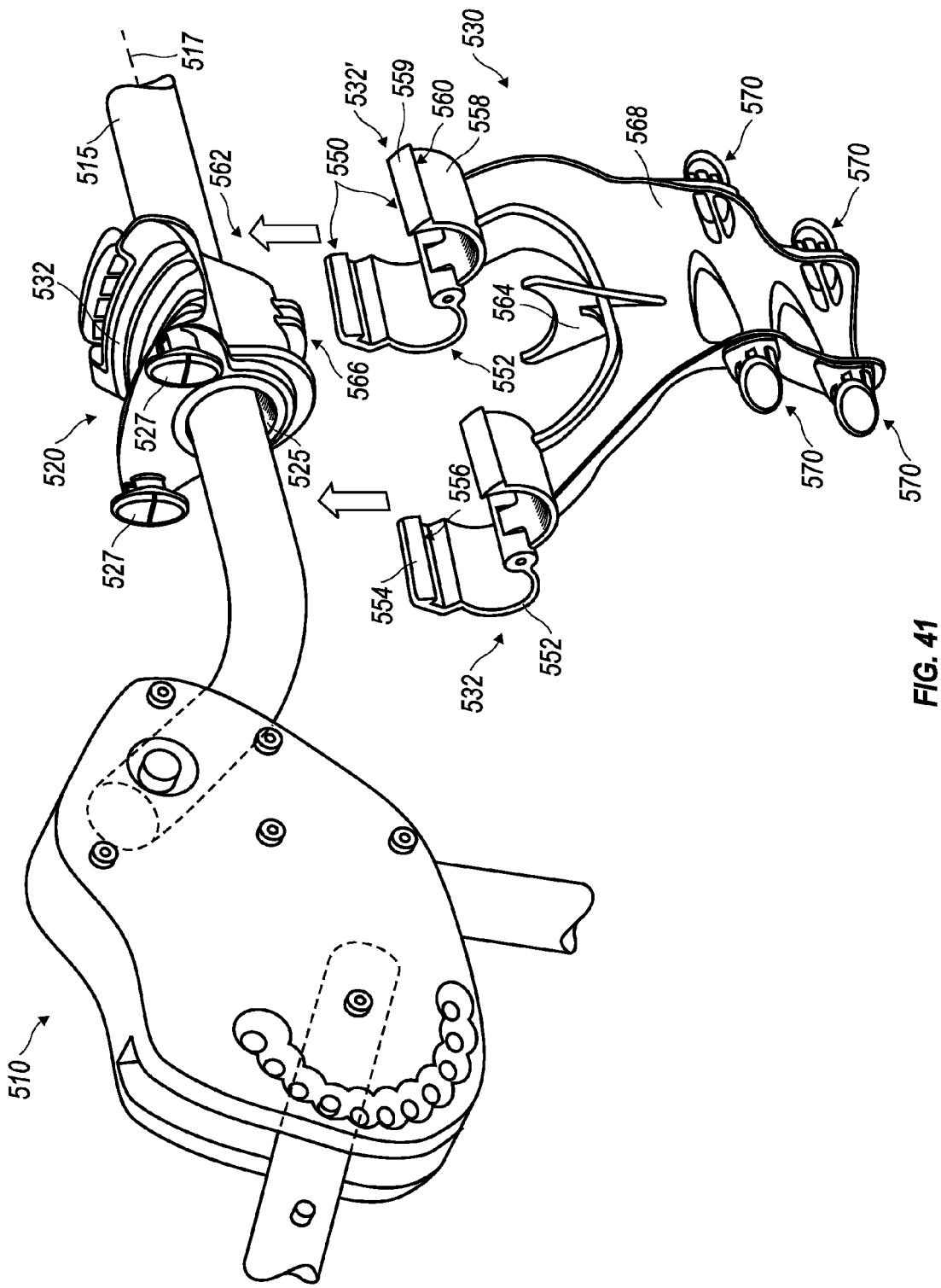

Referring to FIGS. 34-41, an anti-sway arrangement 500 is disclosed that is utilizable for stabilizing a bicycle B supported upon a cradle 520 borne upon an elongate arm 515 of a vehicular mountable load carrier 510. FIG. 1 shows an exemplary and well known rear-mount type carrier that typifies the kind of carrier upon which this anti-sway aspect can be incorporated. Another well known type of carrier is of the hitch-mount type, an exemplary head of which is shown in FIG. 40. According to the embodiments of FIGS. 34-41, the arm-borne cradle 520 has a through-hole located therein, and in which the elongate arm is insert-received. The cradle is configured to abuttingly receive a portion of a bicycle frame thereupon at a bicycle frame engaging surface 522 which can be similar in configuration to those cradles disclosed hereinabove. An anti-sway device 530 is depicted in FIGS. 34-41 as being constituted by a substantially Y-shaped body with two upper arms straddling the cradle 520. The two upper arms are joined together at a lower common leg 568, thereof, which constitutes a bicycle engaging portion 568, and which is configured to abuttingly engage the bicycle B at location distanced from the point of engagement by the cradle.

Each of the two upper arms has an arm engaging portion 532, 532' that includes a releasable clasp that is operator transitionable between a clasping configuration (see FIGS. 34, 35, 37, 39 and 40) in which the anti-sway device 530 is secured to the elongate arm 515 and an open configuration (see FIGS. 36, 38 and 41) in which the device is installable upon, and removable away from the arm in a direction transverse to a longitudinal axis 517 of the elongate arm 515. In this manner, the anti-sway device 530 accommodates its own installation onto, and removal off of the elongate arm 515 of the load carrier 510 without requiring disengagement of the cradle 520 from the elongate arm 515.

Each releasable clasp comprises a pair of two jaws 536 that are movable with respect to one another, and which are positioned closer to one another in the clasping configuration than in the open configuration.

Each pair of two jaws 536 is hinged together thereby accommodating transition between the clasping configuration and the open configuration.

Furthermore, each pair of two jaws 536 further comprises a hinge mechanism 540 that interconnects the two respective jaws, and the hinge mechanism enables relative pivotation between the paired jaws.

In at least one embodiment, each of the hinge mechanisms 540 is constituted by a flexible connector between the respective pair of two jaws 536.

In another exemplary embodiment, each of the hinge mechanisms 540 is constituted by a piano-hinge 544 formed by adjacently positioned cylindrical portions 538 of each of the two respective jaws. In a typical manner, the adjacently positioned cylindrical portions 538 are interlaced for enabling pivotation by a hinge pin 546.

Each pair of jaws further comprises a releasable catch 548 located substantially opposite the respective hinge mechanism 540 for holding the pair of two jaws 536 in a secured configuration about the elongate arm 515 of the load carrier 510.

At least one of the pairs of two jaws 536, when in the secured configuration, forms a tight fit that resists translational movement of the anti-sway device 530 along the elongate arm 515.

Alternatively, and/or complementarily, the two pairs of two jaws, when in the secured configuration, together with the cradle, establishes a binding fit (which is not necessarily a tight fit) upon the elongate arm that similarly resists translational movement of the cradle and anti-sway device along the elongate arm.

Each releasable catch 548 is constituted by two mating portions 550, one on each of the pair of two jaws 536, and the mating portions together establish a snap device.

In the illustrated and preferred embodiments, at least one of the two mating portions 550 that constitute the releasable catch 548 is flexible and has an undercut 556 ramped surface 554 configured for mating engagement with an opposite undercut 560 on the other 558 of the two mating portions. Advantageously, this undercut 560 is also configured in association with a ramped surface 559.

In one development or version of the anti-sway arrangement 500, the cradle 520 and the anti-sway device 530 engage one another in a tongue-in-groove adaptation 562 at a location radially outward from the cradle. The tongue-in-groove adaptation 562 is configured to accommodate independent relative rotation of the cradle and the anti-sway device about the long axis 517 of the elongate arm 515.

A tongue 564 of the adaptation 562 extends in a substantially radial direction from either one of the cradle and the anti-sway device, while a groove 566 is recessed in a substantially radial direction in the other of the cradle and the anti-sway device.

A releasable and variably adjustable securement strap 575 is used for anchoring a substantially horizontally oriented portion of a bicycle on the cradle at strap receiving studs 527. A similar strap 575 is also employable for anchoring a substantially upright-oriented portion of the bicycle to the lower common leg, also referred to as the bicycle engaging portion 568 of the anti-sway device 530.

In an alternative embodiment, the invention takes the form of a method for providing stabilization to a bicycle B supported upon a cradle 520 borne upon an elongate arm 515 of a vehicular mountable load carrier 510. The method comprises installing an anti-sway device 530, in association with the supported cradle 520, without removing the cradle from the elongate arm. In this embodiment, the arrangement includes an arm engaging portion 532 and a bicycle engaging portion 568. The arm engaging portion has a clasp that is operator transitionable between an open configuration in which the device is installable upon the arm from an approach direction transverse to a longitudinal axis of the elongate arm (particularly see FIG. 41), into abutting engagement therewith. It should be appreciated that in the present context, a transverse direction includes those directions that are not parallel with the longitudinal axis 517 of the arm 515.

In a complementary aspect, the method further comprises removing the anti-sway device 530 from the elongate arm 515 without removing the cradle 520 from the arm by releasing the clasp 534 and transitioning the arm engaging portion 532 to the open configuration and moving the anti-sway device 530 away from the arm 515 in a departure direction transverse to the longitudinal axis of the elongate arm.

It should be appreciated that in an alternative embodiment, the anti-sway device 530 may have only a single arm engaging portion 532. There may be a second arm, but which is adapted to merely abut the arm 515, but which does not have a clasp 534 arrangement at the distal end thereof.

It should be further appreciated that other cradle configurations may be employed in the anti-sway arrangement 500 without departing from the scope of these inventive concepts. For example, the cradles of FIGS. 4, 17, 18 and 21-32 can be inventively utilized in the combination.

Although the inventions have been described in connection with preferred embodiments thereof, it will be appreciated by those skilled in the art that additions, modifications, substitutions and deletions not specifically described may be made without departing from the spirit and scope of the invention as defined in the appended claims.

Bicycle carriers adapted to be mounted on carrying vehicles have been disclosed and their components described herein. These and other variations, which will be appreciated by those skilled in the art, are within the intended scope of the patented claims. As previously stated, detailed embodiments of the present inventions are disclosed herein; however, it is to be understood that the disclosed embodiments are merely exemplary of the inventions that may be embodied in various forms.

What is claimed is:

1. An anti-sway device for stabilizing a bicycle supported upon a cradle borne upon an elongate arm of a vehicular mountable load carrier, said device having a clasping configuration and an open configuration and comprising:
    a first portion having a retaining strap, an elongate aperture configured to engage said elongate arm, and a bull-nose portion; and
    a second portion having an arm engaging portion and a bicycle engaging portion configured to abuttingly engage a tube of said bicycle, said arm engaging portion having a releasable clasp that is operator transitionable between a clasping configuration in which the device is secured to an elongate arm of a vehicular mountable load carrier and an open configuration in which the device is installable upon and removable away from the arm in a direction transverse to a longitudinal axis of the elongate arm;
    wherein the bicycle engaging portion is concave shaped to receive the tube of the bicycle, and has a bull-nose receiving portion located adjacent to the arm engaging portion; and
    wherein said first portion is operatively engageable with said second portion at the bull-nose portion and engagement of the first portion enables clasping said first portion and said second portion to said elongated arm.

2. The device as recited in claim 1, wherein said releasable clasp further comprises two jaws movable with respect to one another and which are positioned closer to one another in the clasping configuration than in the open configuration.

3. The device as recited in claim 2, wherein said two jaws are hinged together thereby accommodating transition between the clasping configuration and the open configuration.

4. The device as recited in claim 3, further comprising a hinge mechanism interconnecting said two jaws and said hinge mechanism enabling relative pivotation between said two jaws.

5. The device as recited in claim 4, wherein said hinge mechanism is constituted by a flexible connector between said two jaws.

6. The device as recited in claim 4, wherein said hinge mechanism is constituted by a piano-hinge formed by adjacently positioned cylindrical portions of each of said two jaws that are interlaced by a hinge pin.

7. The device as recited in claim 4, further comprising a releasable catch located substantially opposite said hinge mechanism for holding said two jaws in a secured configuration about an elongate arm of a vehicular mountable load carrier.

8. The device as recited in claim 7, wherein said releasable catch is constituted by two mating portions, one on each of said two jaws, and said mating portions together constituting a snap device.

9. The device as recited in claim 8, wherein at least one of said two mating portions constituting said releasable catch is flexible and has an undercut ramped surface configured for mating engagement with an opposite undercut on the other of the two mating portions.

10. An anti-sway arrangement for stabilizing a bicycle supported upon a cradle borne upon an elongate arm of a vehicular mountable load carrier, said arrangement comprising: the device as recited in claim 1, further comprising: said elongate arm being insert-received in the elongate aperture of the second portion; wherein said second portion comprises an anti-sway device having a substantially Y-shape with two upper arms straddling said cradle second portion, and said two upper arms being joined together at a lower common leg thereof; and each of said two upper arms having an arm engaging portion having a releasable clasp that is operator transitionable between a clasping configuration in which the anti-sway device is secured to the elongate arm and an open configuration in which the device is installable upon and removable away from the arm in a direction transverse to a longitudinal axis of the elongate arm and whereby said anti-sway device accommodates installation onto, and removal off of, the elongate arm of the load carrier without disengagement of the cradle from the elongate arm.

11. The arrangement device as recited in claim 10, wherein each releasable clasp further comprises a pair of two jaws movable with respect to one another and which are positioned closer to one another in the clasping configuration than in the open configuration.

12. The arrangement device as recited in claim 11, wherein each pair of two jaws is hinged together thereby accommodating transition between the clasping configuration and the open configuration.

13. The arrangement device as recited in claim 12, wherein each pair of two jaws further comprises a hinge mechanism interconnecting said pair of two jaws and said hinge mechanism enabling relative pivotation between said pair of two jaws.

14. The arrangement device as recited in claim 13, wherein each of said hinge mechanisms is constituted by a flexible connector between the respective pair of two jaws.

15. The arrangement device as recited in claim 13, wherein each of said hinge mechanisms is constituted by a piano-hinge formed by adjacently positioned cylindrical portions of each of the respective pair of two jaws, said adjacently positioned cylindrical portions being interlaced by a hinge pin.

16. The arrangement device as recited in claim 13, wherein each pair of two jaws further comprises a releasable catch located substantially opposite said respective hinge mechanism for holding said pair of two jaws in a secured configuration about the elongate arm of the vehicular mountable load carrier.

17. The arrangement device as recited in claim 11, wherein at least one of the pairs of two jaws, when in the secured configuration, forms a tight fit that resists translational movement of said anti-sway device along the elongate arm.

18. The arrangement device as recited in claim 11, wherein at least one of the pairs of two jaws, when in the secured configuration, together with said cradle, establishes a binding fit upon the elongate arm that resists translational movement of said cradle and anti-sway device along the elongate arm.

19. The arrangement device as recited in claim 11, wherein each releasable catch is constituted by two mating portions, one on each of said pair of two jaws, and said mating portions together constituting a snap device.

20. The device as recited in claim 1, wherein the each releasable clasp opens on the top portion of the arm engaging portion.

21. The device as recited in claim 1 wherein the restraining strap is removably attached to said first portion.

22. The device as recited in claim 1 wherein the restraining strap has an elongated aperture.

* * * * *